United States Patent [19]
Hedlund

[11] Patent Number: 5,136,584
[45] Date of Patent: Aug. 4, 1992

[54] HARDWARE INTERFACE TO A HIGH-SPEED MULTIPLEXED LINK

[75] Inventor: Kurt A. Hedlund, Chicago, Ill.

[73] Assignee: AT&T Bell Laboratories, Murray Hill, N.J.

[21] Appl. No.: 551,700

[22] Filed: Jul. 11, 1990

[51] Int. Cl.$^5$ .............................................. H04J 3/24
[52] U.S. Cl. ...................................... 370/94.1; 370/60
[58] Field of Search .............................. 340/60, 94.1

[56] References Cited

U.S. PATENT DOCUMENTS

| | | | |
|---|---|---|---|
| 4,516,237 | 5/1985 | Perry et al. | 370/58 |
| 4,577,314 | 3/1986 | Chu et al. | 370/94 |
| 4,625,307 | 11/1986 | Tulpule et al. | 370/85 |
| 4,763,317 | 8/1988 | Lehman et al. | 370/58 |
| 4,794,589 | 12/1988 | Finch et al. | 370/60 |
| 4,802,161 | 1/1989 | Byars et al. | 370/94 |
| 4,835,768 | 5/1989 | Hubbard et al. | 370/106 |
| 4,885,744 | 12/1989 | Lespagnol et al. | 370/94 |
| 4,897,841 | 1/1990 | Gang, Jr. | 370/85.13 |
| 4,933,932 | 6/1990 | Quinguis et al. | 370/60 |
| 4,956,839 | 9/1990 | Torii et al. | 370/60 |

OTHER PUBLICATIONS

*American National Standard for Telecommunications: Digital Hierarchy Optical Interface Rates and Formats Specifications,* ANSI document T1X1.4/87–505R4 (Dec. 1987).

*T1S1 Technical Sub-Committee Broadband Aspects of ISDN, Baseline Document,* Feb., 1990, ANSI document T1S1/90–001.

Primary Examiner—Douglas W. Olms
Assistant Examiner—T. Samuel
Attorney, Agent, or Firm—David Volejnicek

[57] ABSTRACT

A link interface to a high-speed asynchronous multiplexed ATM telecommunication link includes a data segmenter for forming ATM cells out of data frames, and a data assembler and state memory for assembling data frames out of received multiplexed (interleaved-)ATM cells. A novel architecture implemented in hardware, and characterized by absence of intermediate storage of data in the data segmenter and pipelined operation of the data assembler, allows the link interface to operate at hundreds of Megabits and Gigabits per second.

22 Claims, 14 Drawing Sheets

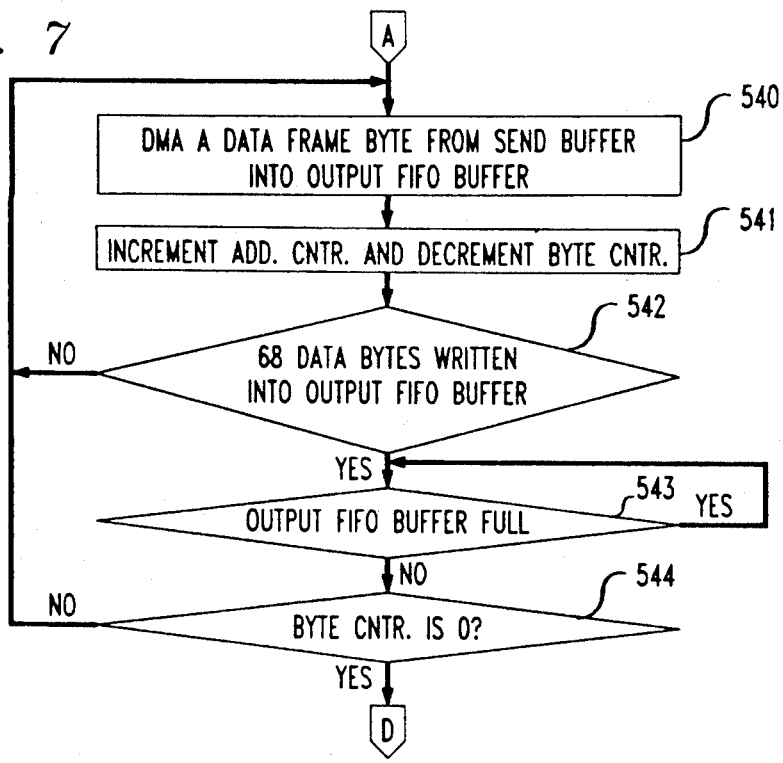
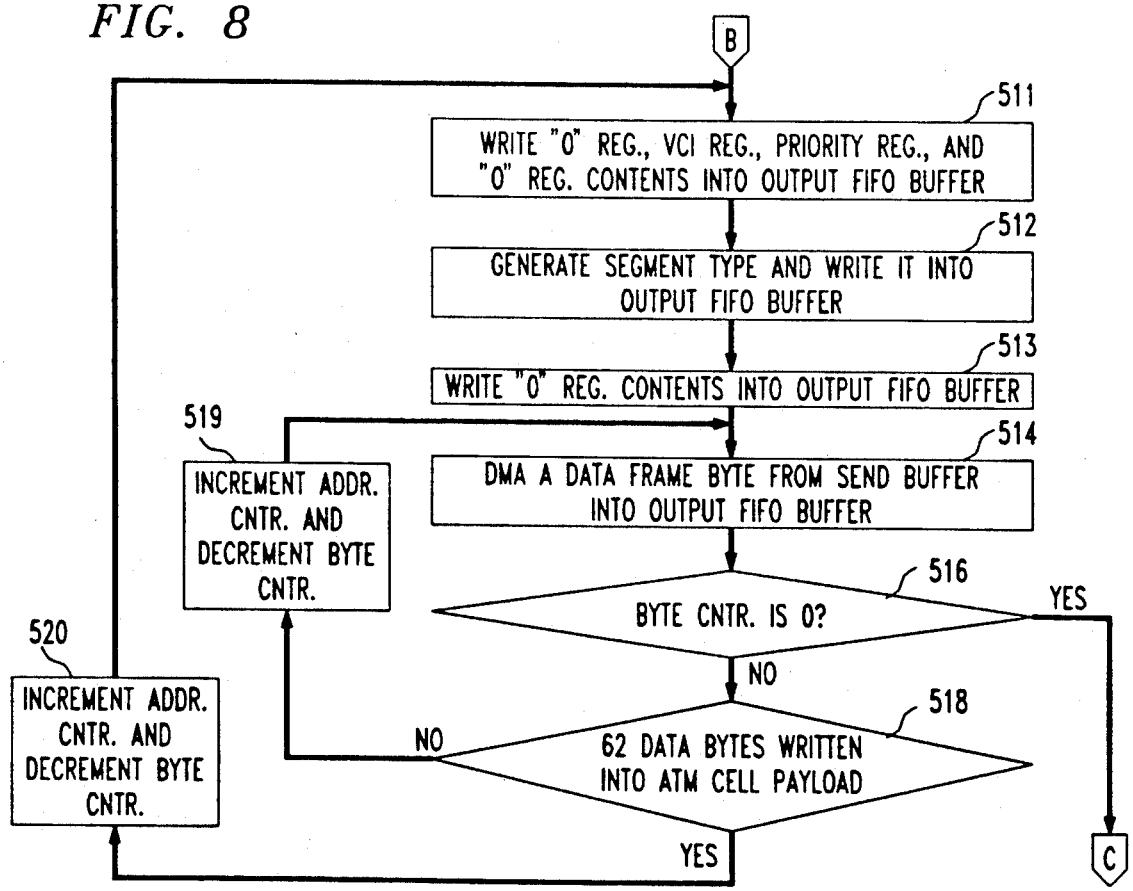

HARDWARE INTERFACE TO A HIGH-SPEED MULTIPLEXED LINK

TECHNICAL FIELD

The invention relates to telecommunication interfaces, including link and data interfaces, protocol converters, and network bridges.

BACKGROUND OF THE INVENTION

Telecommunication link interfaces couple communicating equipment, referred to as customer premises equipment (CPE), to a communications network comprising one or more telecommunication links that transport the communications of the CPEs between the CPEs. Various link interface designs for various networks are well known in the art. An illustrative example is the synchronous packet data interface disclosed in the U.S. Pat. No. 4,577,314.

Until recently, digital communication networks have operated at relatively low transmission rates, up to about 10 Mbps maximum, and conventional link interface designs have served these networks well. However, as network transmission rates are rising, and proposals are made for digital networks operating at hundreds of Mbps or even Gbps, conventional link interface designs reveal a crucial flaw: they are generally unable to operate fast enough to handle these high transmission rates. The above statement tends to be especially true in the case of interfaces to packetized transmission networks, where the interfaces must perform many complex packet-creation and packet-disassembly functions. An example of such an interface is the one disclosed in the patent referred to above: in known implementations, its rate of operation is less than 1 Mbps.

The problem is further exacerbated for multiplexed (i.e., interleaved) communications: not only must the link interface handle the link's transmission rate, but it must additionally perform multiplexing and demultiplexing functions with respect to communications being transmitted and/or received on the link. An illustrative example of a link interface arrangement that tries to deal with packetized asynchronous time-division multiplexed (interleaved) communications is disclosed in U.S. Pat. No. 4,885,744. This arrangement deals with translating existing slow-speed protocols to higher-speed networks, but does not address providing a high-speed interface directly to take advantage of the higher-speed networks. I believe that existing interface arrangements that use the slow-speed protocols will not satisfactorily scale up in speed. New arrangements will therefore be required to fully take advantage of high-speed networks.

SUMMARY OF THE INVENTION

This invention is directed to solving this and other disadvantages of the prior art. I propose an interface design that is capable of handling hundred-Mbps and Gbps digital transmission rates, and that is capable of handling multiplexed/interleaved communications at these rates. According to the invention, an interface to multiplexed high-speed data is pipelined and comprises an input port for receiving data (illustratively, ATM cells) in a serial (such as a byte-serial) form, an output port for transmitting processed received data (illustratively data frame segments retrieved from ATM cells), and a data delay arrangement (illustratively, a delay pipeline) that interconnects the input port with the output port and delays propagation of received data from the input port to the output port in order to provide time for processing of the data. The processing is performed by a control arrangement making use of a state memory and a cascade of connected storage means, such as registers sets. The state memory is used to store information concerning data receivable at the input port, and the information concerning data that is actually received is transferred into the cascade of storage means as needed. The cascade of storage means includes first storage means (illustratively, state retrieval registers set) that are used to store information concerning data whose processing is commencing (illustratively, an ATM cell that is entering the delay arrangement), second storage means (illustratively, working registers set) that are used to store information concerning data that is presently being processed (illustratively, an ATM cell that is presently exiting the delay arrangement), and third storage means (illustratively, state return registers set) that are used to store information concerning data whose processing is ending (illustratively, an ATM cell that is completing exiting of the delay arrangement). The control arrangement responds to commencement of entry of data (i.e., of each ATM cell) into the delay means by transferring information concerning the entering data from the state memory into the first storage means, and determining from contents of the first storage means what type of processing to perform on the entering data. The control arrangement also responds to commencement of emergence of the data from the delay means by transferring information concerning the emerging data from the state memory from the first storage means into the second storage means, and using contents of the second storage means to perform the determined type of processing on the emerging data. The control arrangement further responds to completion of emergence of the data from the delay means by transferring information concerning the emerged data from the second storage means into the third storage means, and then by transferring contents of the storage means into the state memory to preserve it for use by some future entering data (e.g., an ATM cell having the same virtual circuit identifier as the just-emerged ATM cell). Preferably (given the speed constraints of today's software technology) the interface is implemented in hardware, as a collection of registers operating under control of a microcoded control arrangement.

The interface as characterized above is capable of operating at transmission rates of hundreds of Megabits per second and even Gigabits per second, and is capable of handling multiplexed communications at those rates. For purposes of speed, it uses no internal data storage, but merely makes use of the delay pipeline to move data through the interface as rapidly as possible. Also for purposes of speed, the interface pipelines control information via the cascaded storage means, thereby enabling the simultaneous partial processing (or, more specifically, prep-processing, processing, and post-processing) of a plurality of data—three ATM cells in the illustrative example. The processing is not constrained to proceed on a bit-serial basis, but may (and, in the illustrative example, does) proceed on a byte-serial basis, thus further enhancing the speed of operation of the interface. Also, the interface is capable of handling not only synchronous, but also asynchronous, data at the requisite high rates. For top speed, the interface design is implemented in hardware, and is further suited for VLSI implementation.

Both directions of data transfer may make use of the interface architecture characterized above. Alternatively, the generation of multiplexed communications, in the outbound direction on a data link, is not required, and the transmitter portion of the interface may therefore be significantly simplified, leaving only the interface link receiver portion with the above-characterized architecture. According to this aspect of the invention, a high-speed data transmit interface merely comprises an arrangement (such as a direct memory access circuit) for retrieving data from storage, an arrangement (such as a buffer) for receiving a pointer to both a stored frame of data and stored control information for that frame, means for storing the retrieved control information, and an output port connected to the retrieving arrangement, all operating under control of a control arrangement as follows. When the pointer-receiving arrangement has received a pointer, the control arrangement causes the retrieving arrangement to use the received pointer to retrieve the pointed-to control information, which is then stored in the above-mentioned storing means. The control arrangement then uses the retrieved control information to generate a data block header (illustratively, an ATM call header) at the output port, and also causes the retrieving arrangement to use the pointer to retrieve and transmit directly to the output port a block of data of the pointed-to frame. (Illustratively, the block is of fixed size and makes up the payload of the ATM cell.) The control arrangement then merely repeats the header-generation and data-block retrieval steps until all data of the pointed-to frame have been retrieved.

Again, the interface as just characterized advantageously is capable of operating at the requisite high transmission rates, passes data therethrough without making use of internal data storage, can process synchronous as well as asynchronous data, can process data on a byte-serial basis, and is implementable in hardware, including in VLSI form.

These and other advantages and features of the present invention will become apparent from the following descriptions of an illustrative embodiment of the invention taken together with the drawing.

BRIEF DESCRIPTION OF THE DRAWING

FIGS. 6-9 are a flow diagram of the operations of the control sequencer of the data segmenter of FIG. 5;

DETAILED DESCRIPTION

Figure 1:
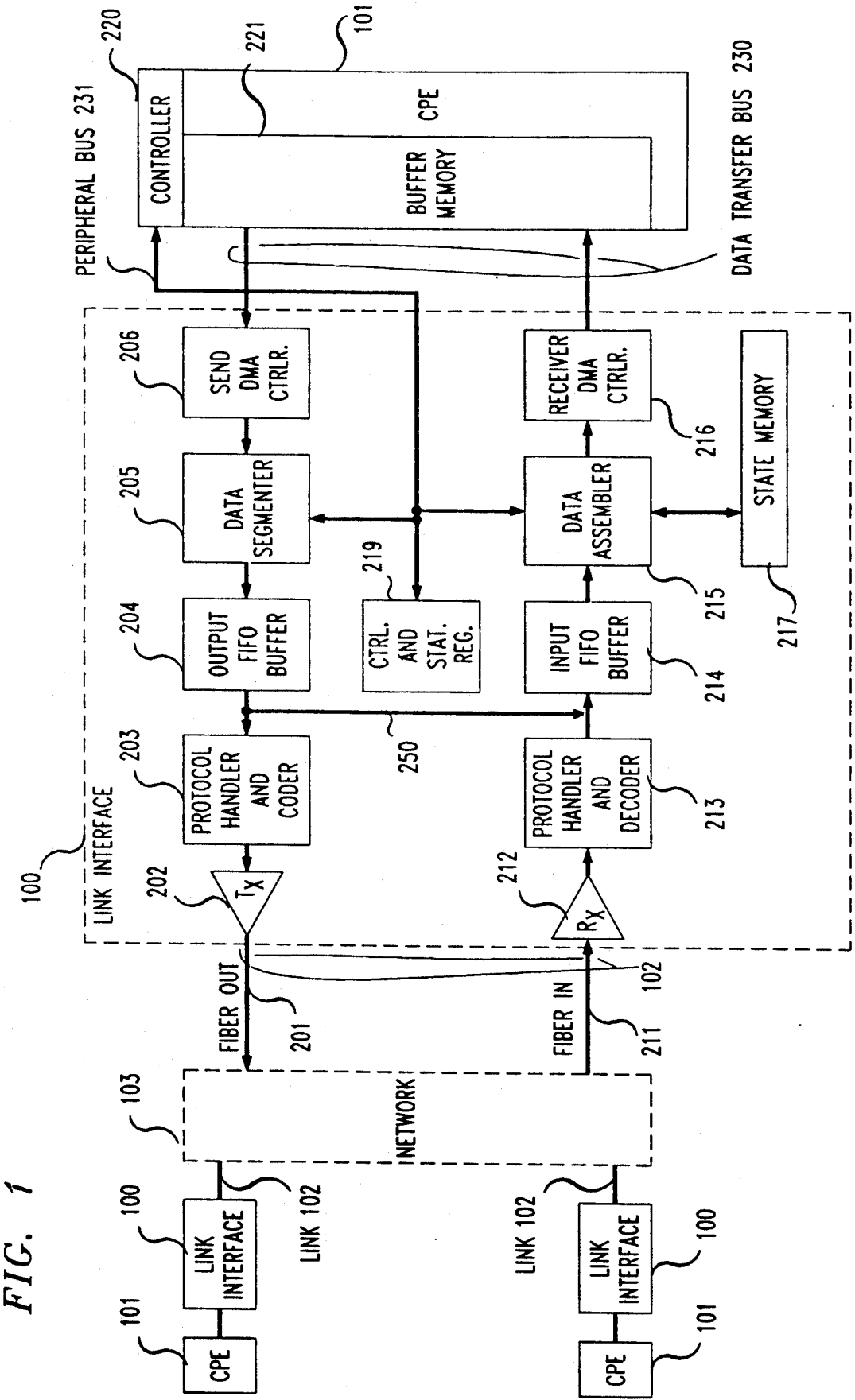
FIG. 1 is a block diagram of telecommunication system that includes and illustrative embodiment of the invention.

FIG. 1 shows an illustrative telecommunications system. As is common, the system comprises a communications network 103 made up of a plurality of telecommunication links 102, and a plurality of CPEs 101, each interfaced to a link 102 by a link interface 100. CPEs 101, links 102, and network 103 are all conventional in this example. Illustratively, CPEs 101 are processors, such as computers or controllers, network 103 is a switched wide-area network, and links 102 are optical fiber links.

Each link 102 comprises a pair of optical fibers 201 and 211, one for each direction of transmission. Network 103—and hence fibers 201 and 211 of links 102—follow the synchronous optical network (SONET) communication protocol. The SONET protocol is described in *American National Standard for Telecommunications: Digital Hierarchy Optical Interface Rates and Formats Specification*, ANSI document T1X1/4-87-505 R4 (Dec. 11, 1987). The rate of transmissions on fibers 201 and 211 is 150 Mbps in this illustrative example.

Fiber 201, which carries communications outgoing from CPE 101 into network 103, is driven by a conventional optical transmitter 202 of link interface 100. Data for transmission is supplied to transmitter 202 by a protocol handler and coder 203. Handler and coder 203 is a functional element of conventional design, and it implements the SONET protocol. The SONET protocol can carry in its payload cells of the asynchronous transfer mode (ATM) format, described in *T1S1 Technical Sub-Committee, Broadband Aspects of ISDN, Baseline Document February*, 1990, ANSI document T1S1/90-001. Handler and coder 203 receives CPE data, formatted as ATM cells, from output FIFO buffer 204, encodes the ATM cells in the SONET protocol, and supplies the encoded data to transmitter 202.

In the opposite direction of data transfer on link 102, fiber 211 carries communications incoming to CPE 101 from network 103, and drives a conventional optical receiver 212 with those data. Receiver 212 supplies the received data to a protocol handler and decoder 213. Like handler and coder 203, handler and decoder 213 is also a functional element of conventional design, but performs the converse function. It receives data under the SONET protocol, decodes the received data into ATM cells, and feeds the cells into an input FIFO buffer 214.

As described so far, link interface 100 is conventional, and its function is driven by the particular communication protocol used by network 103. If network 103 were an electronic or a radio network, as opposed to an optical network, optical transmitter 202 and receiver 212 would change accordingly. Similarly, protocol handler and coder 203 and handler and decoder 213 would change with the particular protocol followed by network 103. Furthermore, elements 203 and 213 might even be completely eliminated, for example, if network 103 were to carry data in bare ATM cell format, with no other protocol overlay. Consequently, elements 202, 212, 203, and 213 may be considered to be a part of a link 102 subsystem.

CPE 101 includes a controller 220 for controlling the operation of CPE 101, and a buffer memory 221 for communicating with link interface 100. Controller 220 and buffer memory 221 may be any suitable conventional devices. For example, if CPE 101 is a computer, controller 220 is illustratively the computer's CPU or I/O processor, and memory 221 is illustratively a portion of the computer's RAM space or an I/O buffer memory. Controller 220 is coupled to link interface 100 by a peripheral bus 231, while buffer memory 221 is coupled to link interface 100 by a data transfer bus 230. Peripheral bus 231 is used by link interface 100 and controller 220 to communicate to each other control and status information, such as notice of availability of data and the location of that data in buffer memory 221. Some control and status information common to the entire interface is exchanged through a conventional control and status register 219 of link interface 100, which is connected to peripheral bus 231.

Transfers of available data from and to memory 221 are accomplished via data transfer bus 230 by direct memory access (DMA) controllers 206 and 216 of link interface 100. Send DMA controller 206 retrieves data from buffer memory 221 for transmission on link 102, while receive DMA controller 216 stores in buffer memory 221 data received on link 102. Both DMA controllers 206 and 216 illustratively are of conventional design. Their particular operational characteristics are a function of, and vary with, the characteristics and protocol of whatever bus is selected to serve as data transfer bus 230.

Illustratively, data are exchanged between CPE 101 and link interface 100 in contiguous variable-size blocks, referred to herein as data frames. In one example, CPE 101 is an interface to an Ethernet local area network, and the data frames comprise Ethernet packets.

A control function of link interface 100 is to provide data frame-to-ATM cell adaption and ATM cell-to-data frame adaption. These are complex packet-creation and packet-disassembly functions that typically constitute the "bottleneck", the operating limiter of the speed, of a link interface. Consequently, it is crucial to the high speed operability of link interface 100 that these functions be performed rapidly and efficiently.

In accordance with the invention, therefore, link interface 100 is implemented in hardware, and includes a data segmenter 205 which provides the data frame-to-ATM cell adaption function, and a data assembler 215 and state memory 217 which provide the ATM cell-to-data frame adaption function, in a multiplexed-link 102 environment, in an efficient and speedy manner.

Before discussing the structure and operation of elements 205, 215, and 217, it will be helpful to consider the specific ATM cells and buffer memory 221 data structures between which those elements perform adaption in this illustrative example.

Figure 2:
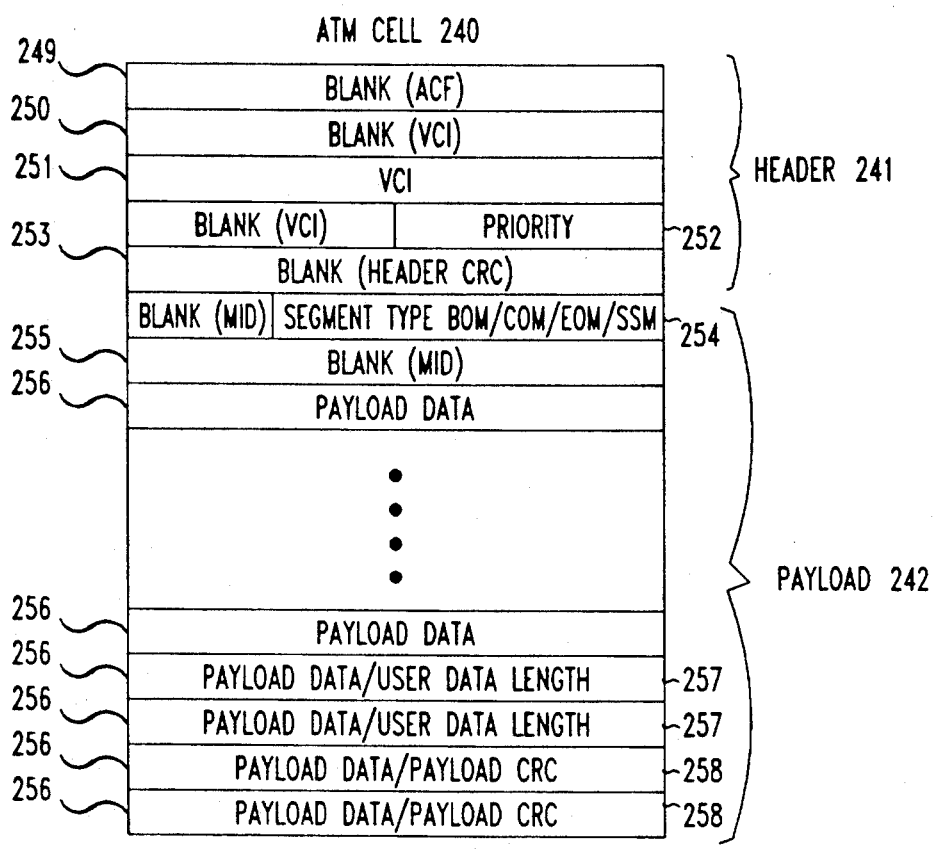
FIG. 2 is a block diagram of an ATM cell of the system of FIG. 1.

The complete ATM cell structure as presently defined is described in the ANSI document referred to above. This structure comprises 53 bytes. Other iterations of the structure have included 69 bytes, and it is this structure on which the illustrative embodiment disclosed herein is based. For purposes of this application, an ATM cell may be viewed as structured in the simplified manner shown in FIG. 2. This figure shows an illustrative ATM cell 240 as comprising 69 bytes divided among a header 241 and a payload 242. Header 241 consists of the first five bytes of ATM cell 240. In this example, header 241 contains information for the ATM protocol layer. The first two bytes are blank, reserved for an access control field (ACF) 249 and a virtual circuit identifier (VCI) field 250. ACF 249 is conventionally computed by protocol handler and coder 203. The third byte is the presently-used VCI field 251. The first half of the fourth byte is blank, reserved for a VCI field, while the second half of the fourth byte is a priority field 252. In this illustrative embodiment, the fifth byte is blank, reserved for an error correction field 253—a CRC value computed over header 241 by protocol handler and coder 203. In an alternative embodiment, computation of field 249 ACF value and field 253 CRC value may just as easily be accomplished by data segmenter 205.

Payload 242 constitutes 64 bytes. In this illustrative embodiment, the first two bytes of payload 242 implement the adaptation protocol layer. The first byte of payload 242 contains two fields: a partial message I.D. (MID) field and a segment type field 254. Since data frames of information used by CPE 101 come in variable sizes, an ATM cell 240 may accommodate a whole data frame, or only a particular segment thereof, and segment type field 254 is used to indicate this information. An SSM value in segment type field 254 indicates that a whole data frame is contained within ATM cell 240. A BOM value indicates that ATM cell 240 contains only the beginning segment of a data frame. A COM value indicates that ATM cell 240 contains a continuing (neither the beginning nor the ending) segment of a data frame. And a EOM value indicates that ATM cell 240 contains an ending segment of a data frame.

The second byte of payload 242 is blank, reserved for the remainder of the message identifier (MID) field 255. The subsequent 62 bytes of data make up a buffer payload data field 256 in all ATM cells 240 but the last ATM cell 240 of a data frame. That is, data field 256 is 62 bytes long in ATM cells 240 designated by segment type BOM or COM in segment type field 254. But in the last ATM cell 240, i.e., cell of segment type EOM or SSM, data field 256 is 58 bytes long. In this embodiment, the last four bytes are part of the convergence protocol layer. The penultimate pair of bytes in the last ATM cell 240 make up a user data length field 257 for indicating the number of user data bytes within the corresponding data frame. The last pair of bytes in the last ATM cell 240 make up a buffer payload CRC field 258 for a CRC value computed over the entire corresponding data frame.

Figure 3:
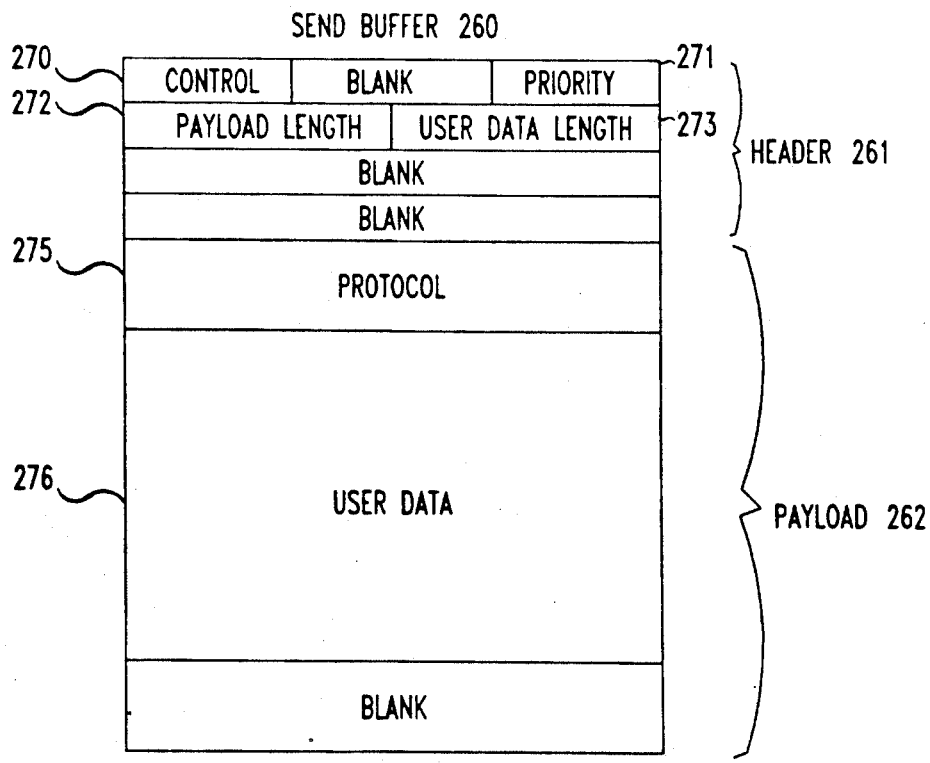
FIG. 3 is a block diagram of a send buffer of the buffer memory of the system of FIG. 1.
Figure 4:
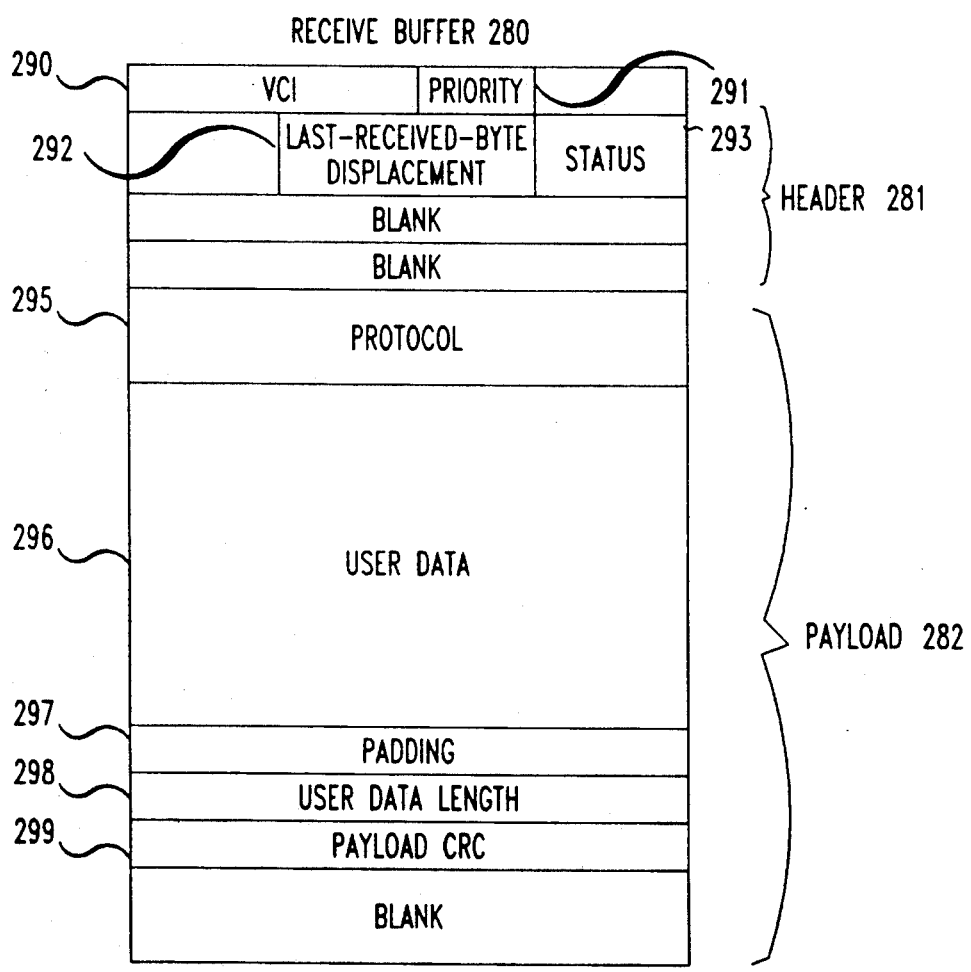
FIG. 4 is a block diagram of a receive buffer of the buffer memory of the system of FIG. 1.

Buffer memory 221 data structures are shown in FIGS. 3 and 4, and are referred to as send buffers 260 and receive buffers 280. In this illustrative example, there is a plurality of buffers 260 and 280, each buffer 260 and 280 comprises 512 memory words, and each word is 4 bytes wide, for a total of 2K bytes.

FIG. 3 shows a send buffer 260, used to move information from CPE 101 to link interface 100. Buffer 260 is divided into a header 261 and a payload 262. Header 261 consists of the first four words of send buffer 260. The first byte of the first word defines a control information field 270. The second and third bytes of the first word are blank in this example. The fourth byte of the first word defines a priority field 271. The first and second bytes of the second word define a payload length field 272, which specifies how many bytes of payload 262 are actually in use, i.e., are occupied by a data frame. The third and fourth bytes of the second word define a user data length field 273, which specifies how many bytes of payload 262 are occupied by user data, as opposed to some other information. The third and fourth words of header 261 are blank in this example.

Payload 262 comprises the fifth and subsequent words of send buffer 260. Payload 262 contains the data frame. Since data frames may be of variable length, some bytes of payload 262 may remain empty. The first 26 bytes of payload 262 are occupied by protocol-related information field 275—the convergence protocol layer in this example. Subsequent one or more bytes of payload 262 are occupied by user data and form a user data field 276. The number of bytes occupied by user data, i.e., the length of user data field 276, is contained in user data length field 273 of header 261. This number plus the length of the protocol-related information field 275—26 in this example—is contained in payload length field 272 of header 261.

FIG. 4 shows a receive buffer 280, used to move information from link interface 100 to CPE 101. Buffer 280 is divided into a header 281 and a payload 282. Header 281 consists of the first four words of receive buffer 280. The first two-and-half bytes of the first word define a VCI field 290. The second half of the third byte of the first word defines a priority field 291. The fourth byte is blank. The first byte of the second word is also blank. The second and third bytes of the second word define a last-received-byte displacement field 292, which identifies the last used, i.e., occupied, byte of payload 282. The fourth byte of the second word defines a status field 293 of the corresponding data frame. The third and fourth words of header 281 are blank.

Payload 282 comprises the fifth and subsequent words of receive buffer 280. Payload 282 contains the data frame. Since data frames may be of variable length, some bytes of payload 282 may remain empty. The first 26 bytes of payload 282 are occupied by a protocol-related information field 295, which is equivalent to field 275 of send buffer 260 of FIG. 3. Subsequent one or more bytes of payload 282 are occupied by user data and form a user data field 296, which is equivalent to field 276 of send buffer 260 of FIG. 3. Field 297 is followed by zero or more bytes of padding—all zeros in this example—carried by otherwise-unused buffer payload data 256 bytes of the last ATM cell 240 of the frame buffer, and form a padding field 297. Field 297 is followed by a user data length field 298, which contains the length of user data field 296. And field 298 is followed by a buffer payload CRC field 299, which contains a CRC value computed over the entire corresponding other half of data frame.

Returning to FIG. 1, controller 220 initiates the transmission of data on link 102 by passing a pointer to a buffer 260, and a Virtual Circuit Identifier (VCI), to data segmenter 205 via peripheral bus 231. Data frames to be transmitted reside in buffer memory 221 complete with necessary per-frame control information, as depicted in FIG. 3. The VCI is passed via peripheral bus 231 instead of through send buffer 260 to allow the same send buffer 260 to be queued for transmission on several virtual circuits simultaneously, i.e., to support more efficient broadcast and multicast. In normal operation, data segmenter 205 accomplishes the transmission by reading the frame control information and the data itself from the specified send buffer 260 in buffer memory 221, by segmenting the data into ATM cells 240, forming the appropriate ATM cell 240 header 241 and payload 242 control fields at the beginning of each ATM cell 240, and by computing and appending the user data length field 257 and buffer payload CRC field 258 calculated over the data frame. Data segmenter 205 passes the send buffer 260 pointer back to controller 220 with an interrupt when data frame transmission is complete. One data frame is transmitted at a time (i.e., frames are not interleaved in this example), but several send buffers 260 may be queued for transmission simultaneously.

When operating in a "raw mode", e.g., for maintenance purposes, data segmenter 205 ignores the frame control information and merely retrieves payload 282 data from send buffer 260 in 68 byte blocks and transmits the retrieved data without change or further operation thereon.

Controller 220 readies data assembler 215 for data frame reception by loading pointers to free receive buffers 280 into data assembler 215 via peripheral bus 231. In normal operation, data assembler 215 receives ATM cells 240 from link 102, strips and interprets header 241 and payload 242 control information, writes the received data frame segments into contiguous receive buffer 280 memory, and checks that the full data frame arrived without error. Received data frame status information is written into status field 293 of receive buffer 280. The receive buffer 280 pointer is then returned to controller 220 via peripheral bus 231, along with an interrupt.

When operating in the "raw mode", data assembler 215 merely treats information received over link 102 as 68 byte data blocks and stores the received data in payload 282 of a receive buffer 280 without change or further operation thereon.

Since ATM cells 240 carrying segments of different data frames may be interleaved on link 102 (i.e., link 102 may be multiplexed), data assembler 215 has the ability to assemble 256 data frames concurrently. For this purpose, data assembler 215 has associated therewith state memory 217, which is indexed by VCIs and holds incomplete data frame state information until data frame reception and assembly is completed.

Figure 5:
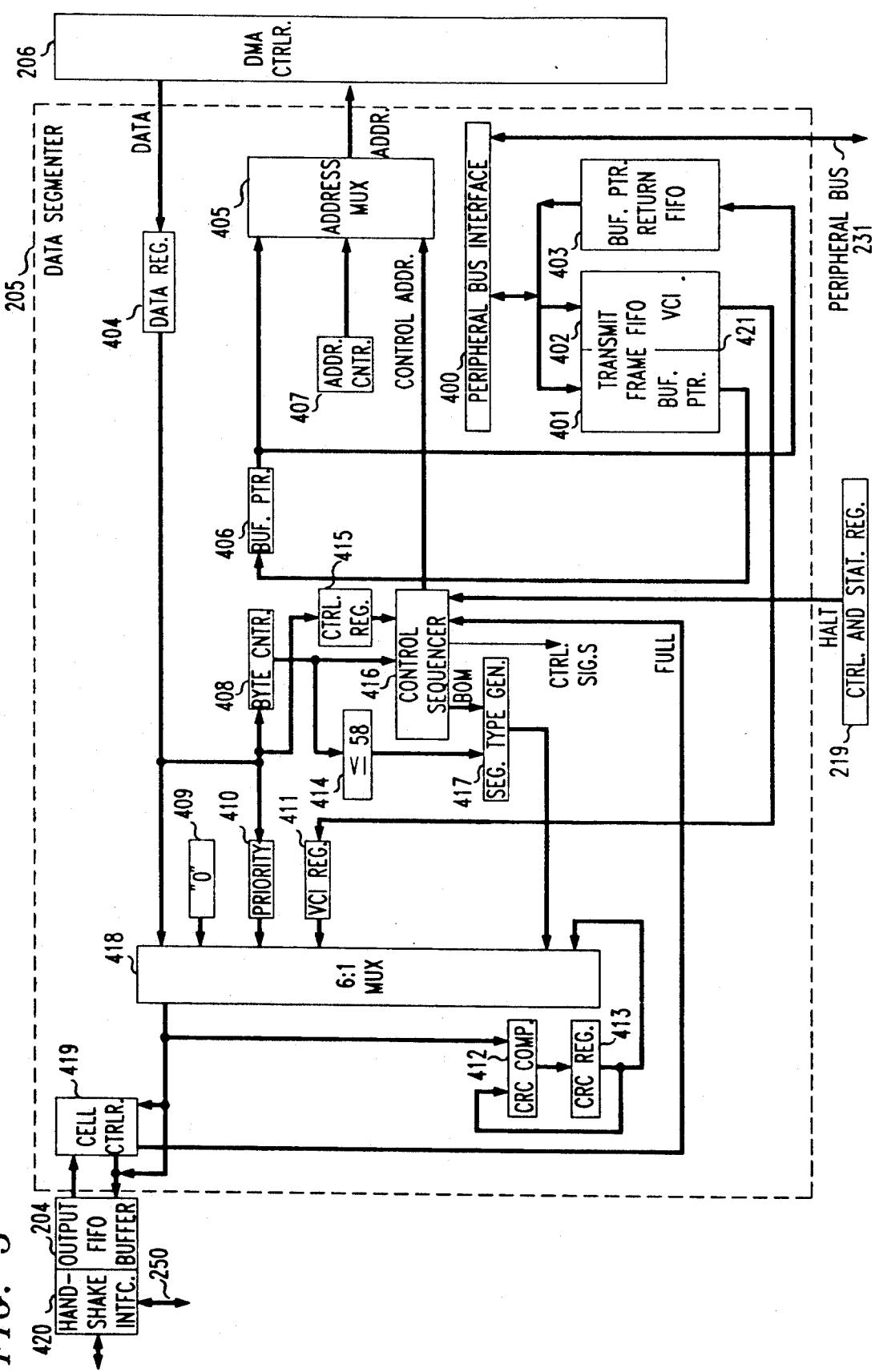
FIG. 5 is a block diagram of the data segmenter of the system of FIG. 1.
Figure 6:
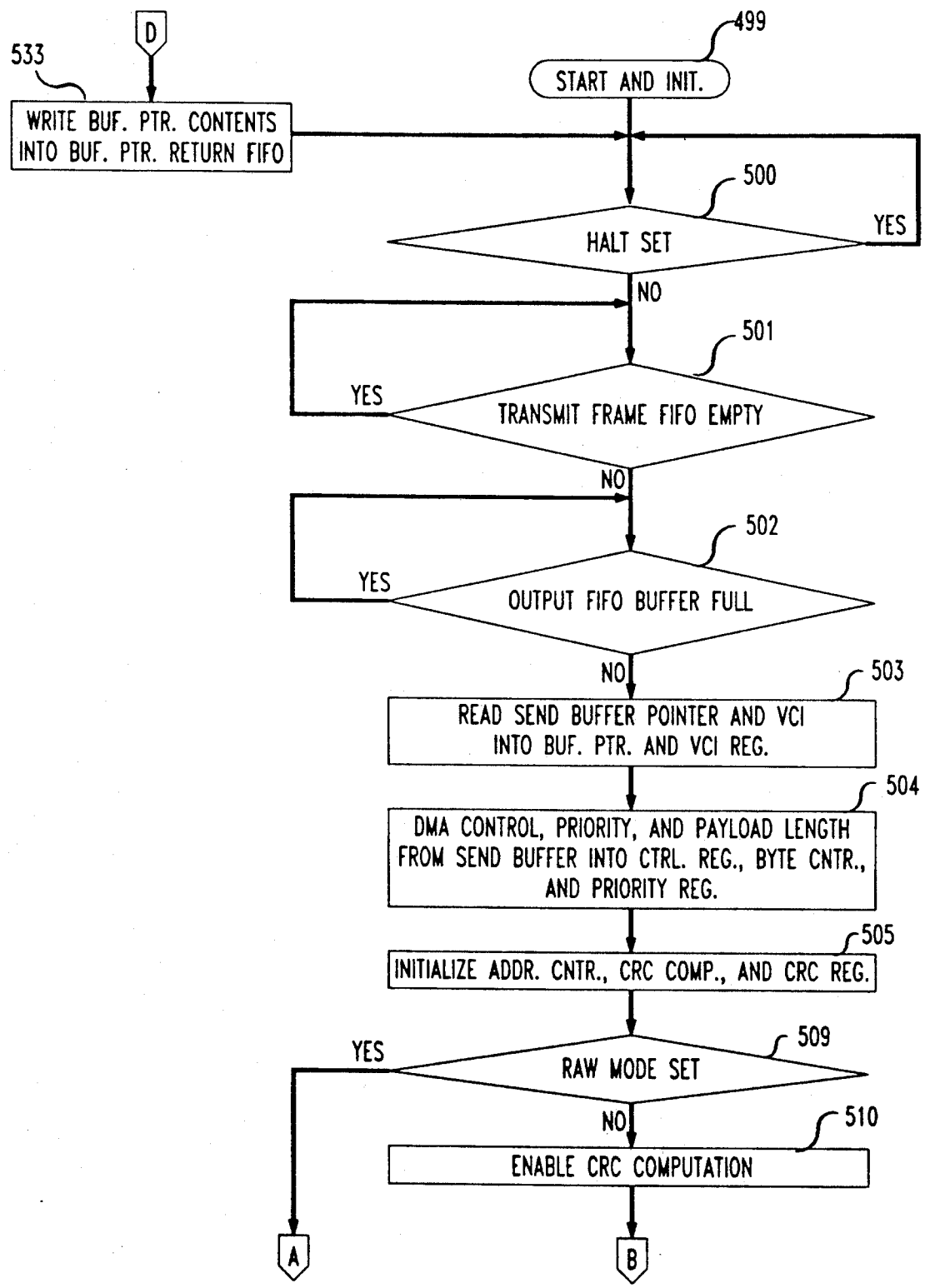
Figure 9:
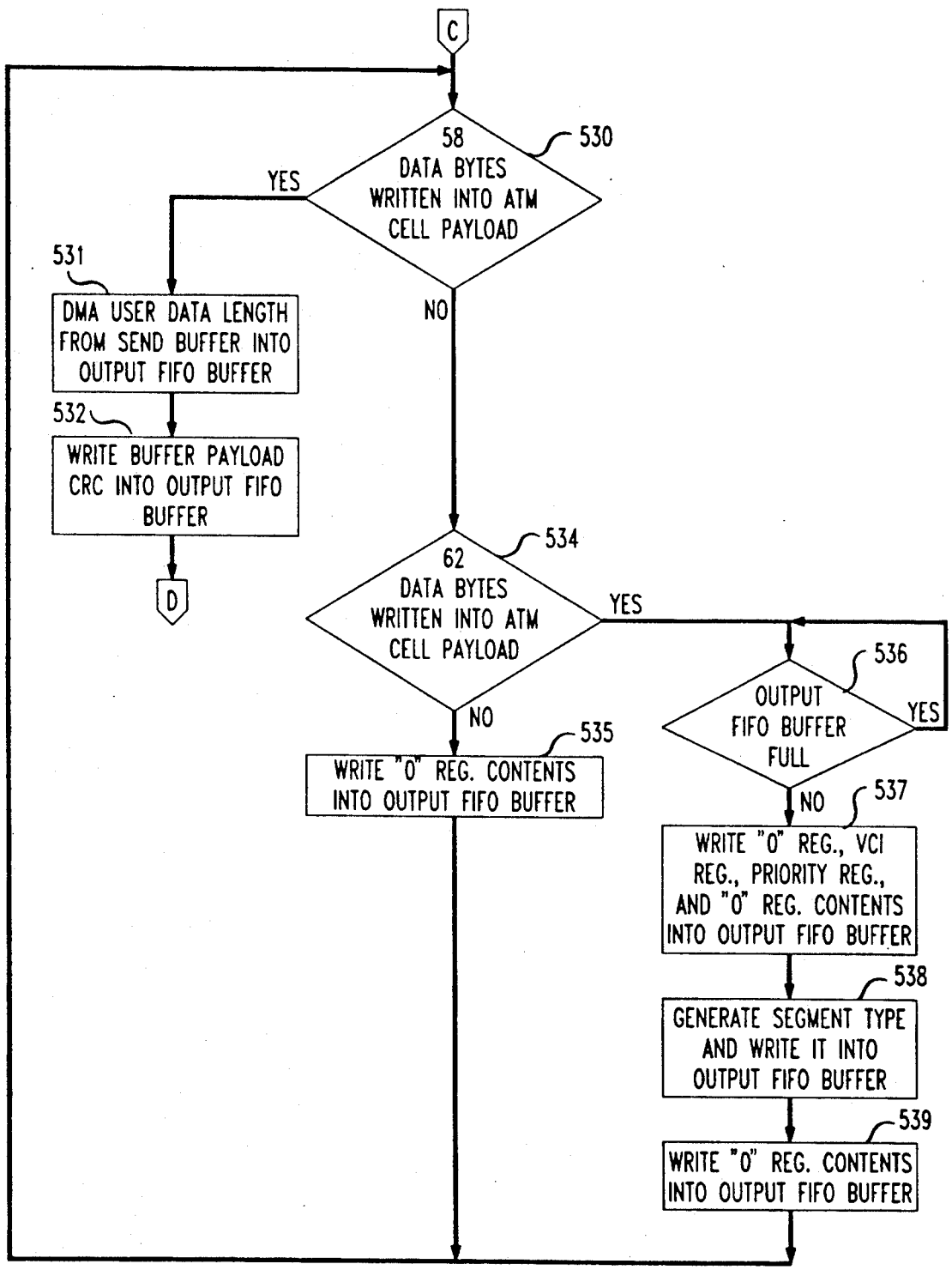

FIG. 5 shows a block diagram of the structure of data segmenter 205. Segmenter 205 includes a peripheral bus interface 400 for effecting communications over peripheral bus 231. The output of interface 400 is connected to the input of a transmit frame FIFO 421, which has two portions: a buffer pointer portion 401 for storing pointers to full send buffers 260 received over bus 231 from controller 220, and a VCI portion 401 for storing VCIs received over bus 231 from controller 220. The input of interface 400 is connected to the output of a buffer pointer return FIFO 403, which is used to store pointers to used send buffers 260 being returned to controller 220 to be freed.

The output of buffer pointer portion 401 of transmit frame FIFO 421 is connected to the input of a buffer pointer register 406. Register 406 stores the buffer pointer of send buffer 260 presently being processed by data segmenter 205. The output of register 406 is connected through an address multiplexer 405 to an address input of DMA controller 206, to designate to DMA 206 the send buffer 260 being accessed. The output of register 406 is also connected to the input of buffer pointer return FIFO 403, to return to controller 220 the pointer to the presently-processed buffer 206 when processing thereof is completed.

A second input of address multiplexer 405 is connected to a CONTROL ADDRESS bus over which a control sequencer 416 supplies offset pointers to send buffer 260 header 261 fields that are to be accessed. A third input of address multiplexer 405 is connected to the output of an address counter 407, which generates offset pointers to sequential bytes of send buffer 260 payload 262. Address multiplexer 405 concatenates the offset pointers supplied by CONTROL ADDRESS bus or by address counter 407 with the send buffer 260 pointer supplied by buffer pointer register 406 to create for DMA controller 206 the addresses of buffer memory 221 bytes that controller 206 is to retrieve.

A data output of DMA controller 206 is connected to the input of a data register 404. Register 404 buffers each byte of data retrieved by DMA controller 206 from buffer memory 221, thereby masking any differences in timing between the operation of DMA controller 206 and data segmenter 205. The output of data register 404 is connected to the inputs of a control register 415, a byte counter 408, a priority register 410, and to the input of output FIFO buffer 204 through a multiplexer 418.

Control register 415 receives control field 270 from send buffer 260. An 8-bit priority register 410 receives priority field 271 from send buffer 260 into its last four bits; its first four bits are permanently set to 0 in this example. Byte counter 408 receives payload length field 272 from send buffer 260. And output FIFO buffer 204 receives the data frame contained in payload 262 of send buffer 260.

The outputs of control register 415 and byte counter 408 are connected to inputs of a control sequencer 416. Control sequencer 416 is a microcoded hardware device that controls the operation of data segmenter 205, and for that purpose has control signal connections (not shown for clarity) to the various elements 400-415 and 417-421 thereof. Control sequencer 416 is discussed in some detail below in conjunction with FIGS. 6-9.

The output of byte counter 408 is also connected to the input of a ≦58 comparator 414, which keeps track of whether fewer than 58 bytes of data (no more than a full buffer payload data field 256 of payload 242 of a last ATM cell 240) remain to be retrieved from payload 262 of send buffer 260. The output of comparator 414 is connected to one input of segment type generator circuit 417. Circuit 417 generates the segment type information for segment type field 254 of ATM cells 240. Input from control sequencer 416 identifies to circuit 417 the beginning of data frame (BOM) segment. Input from ≦58 comparator 414 indicating fewer than 58 data bytes identifies to circuit 417 the end of data frame (EOM) segment. The two inputs when present simultaneously identify to circuit 417 the single-segment. The output of circuit 417 is connected through multiplexer 418 to the input of output FIFO buffer 204.

The full 8-bit output of priority register 410 is connected through multiplexer 418 to the input of output FIFO buffer 204. Likewise, the output of a "0" register 409 is connected through multiplexer 418 to the input of FIFO 204. Register 409 contains a byte's-worth of zeroes, which are used to pad blank or otherwise-unused bytes of an ATM cell 240.

The output of VCI portion 402 of transmit frame FIFO 421 is connected to the input of VCI register 411. The output of VCI register 411 is connected through multiplexer 418 to the input of output FIFO buffer 204.

The various elements, described above as connected through multiplexer 418 to the input of output FIFO buffer 204, are connected to different inputs of multiplexer 418, and only the output of multiplexer 418 is connected directly to the input of output FIFO buffer 204. The output of multiplexer 418 is also connected to one input of a CRC computation circuit 412. Circuit 412 computes the value of buffer payload CRC field 258 of the last ATM cell 240 (see FIG. 2). A second input of circuit 412 is connected to the output of a CRC register 413, whose input is connected to the output of circuit 412. Register 413 stores partial results calculated by circuit 412, i.e., the CRC value calculated by circuit 412 over fewer than all bytes over which the value of field 258 is calculated. Register 413 also stores the final result. The output of CRC register 413 is also connected through multiplexer 418 to the input of output FIFO buffer 204, to enable register 413 to supply the final result to output FIFO buffer 204.

The output of multiplexer 418 is further connected to the input of a cell control circuit 419. Circuit 419 performs ATM 240 cell-delimiting functions. The input from multiplexer 418 to output FIFO buffer 204 is a byte (8 bits) wide, while FIFO 204 is 9 bits wide. Circuit 419 has an output connected to the full 9-bit wide input of FIFO 204. Circuit 419 monitors the input to output FIFO buffer 204 from multiplexer 418 and stores a framing signal in the ninth output FIFO buffer 204 bit along with the first and thereafter every 68th byte entering output FIFO buffer 204 from multiplexer 418 (where 68 is the number of bytes per ATM cell 240). The framing signal thus identifies the corresponding byte as the first byte of an ATM cell 240. Also, following each last byte of an ATM cell 240, cell control circuit 419 generates and stores in output FIFO buffer 204 one or more ATM cell-delimiting bytes. Circuit 419 furthermore monitors how full output FIFO buffer 204 is, and sends control signals over FULL signal line to control sequencer 416 to cause it to pause, and then to continue, data segmenter 205 operation, thereby keeping output FIFO buffer 204 from overflowing.

A handshake interface 420 couples output FIFO buffer 204 to the communication path that connects it with protocol handles and coder 203. Interface 420 monitors the contents of output FIFO buffer 204. When retrieval of any preceding ATM cell from output FIFO buffer 204 has been completed, handshake interface 420 checks whether, and waits until, output FIFO buffer 204 contains a full ATM cell 240, and then engages in a conventional handshake protocol exchange with protocol handler and coder 203 to effect retrieval from output FIFO buffer 204 of the next stored ATM cell 240. Interface 420 discards the cell-delimiting bytes that are inserted into output FIFO buffer 204 by cell controller 419. For test purposes, interface 420 also implements loop-around between output FIFO buffer 204 and input FIFO buffer 214, in a conventional manner, via a communication path 250 that connects interface 420 with a corresponding handshake interface 620 of input FIFO buffer 214.

FIGS. 6-9 show a flow diagram of the operation of data segmenter 205 that is effected by control sequencer 416. Upon startup and initialization, at step 499, sequencer 416 accesses control and status register 219 and checks if the data sequencer "halt" bit thereof is set, at step 500. If so, sequencer 416 keeps periodically repeating the check at step 500 until the data sequenter "halt" bit is reset by controller 220. When the "halt" bit is found to be reset, sequencer 416 checks frame FIFO 421 to determine if it is empty, at step 501. If so, sequencer 416 keeps repeating the check at step 501.

When controller 220 has completed storing a data frame and header information in a send buffer 260, it loads the pointer to that send buffer 260 into buffer pointer portion 401 of FIFO 421, and loads VCI of the channel on which the data frame is to be sent out into VCI portion 402 of FIFO 421, through peripheral bus interface 400. If the data frame is to be sent on more than one channel, i.e., if it is to be multicast, controller 220 loads the pointer to that same send buffer 260 into FIFO 421 a multiple number of times, each accompanied by a different VCI.

When sequencer 416 senses the contents of FIFO 421, at step 501, it checks the FULL signal line from cell controller 419 to determine if output FIFO buffer 204 is full, at step 502. If so, sequencer 416 keeps repeating the check, waiting for output FIFO buffer 204 to cease being full. If and when output FIFO buffer 204 is not full, sequencer 416 reads a send buffer 260 pointer from buffer pointer portion 401 of FIFO 421 into buffer pointer register 406, and reads the accompanying VCI from VCI portion 402 of FIFO 421 into VCI register 411, at step 503. Buffer pointer register 406 supplies buffer pointer to address multiplexer 405. Sequencer 416 then effects a DMA transfer of send buffer 260 header 261 fields 270, 271, and 272 into registers 415, 410, and 408 of interface 100, at step 504. Sequencer 416 does so as follows.

First, sequencer 416 sets address multiplexer 405 to accept input from the CONTROL ADDRESS bus of sequencer 416. Sequencer 416 then generates on that bus a sequence of offset pointers to control field 270, priority field 271, and payload length field 272. Address multiplexer 405 sequentially concatenates the offset pointers generated by sequencer 416 with the buffer 260 pointer supplied by buffer pointer register 406 to create addresses of the desired buffer 260 header 261 fields, and supplies those addresses to DMA controller 206. DMA controller 206 retrieves the desired fields from buffer 260 and sends them sequentially to data register 404. Sequencer 416 retrieves the bytes from data register 404 one at a time as they are entered therein by DMA controller 206, and stores them in control register 415, byte counter 408, and priority register 410. Byte counter 408 supplies its contents to $\leq 58$ comparator 414 and control sequencer 416.

Next, sequencer 416 initializes address counter 407, CRC computation circuit 412, and CRC register 413, at step 505. Address counter 407 is initialized to point to the first byte of buffer 260 payload 262. Sequencer 416 then checks contents of control register 415 for whether a "raw mode" bit is set therein, at step 509. If not, normal operation is called for, requiring ATM cell 240 formation. Sequencer 416 therefore enables CRC computational circuit 412, at step 510. Henceforth, any byte appearing at the output of multiplexer 418 is included by CRC computation circuit 412 in its computation of a CRC value. Next, sequencer 416 sequentially writes contents of "0" register 409, VCI register 411, priority register 410, and again "0" register 409 through multiplexer 418 into output FIFO buffer 204, at step 511, thereby creating an ATM cell 240 header 241 in output FIFO buffer 204.

Cell control circuit 419 senses the first incoming byte, of "0" register 409 contents, to be the first byte of an ATM cell 240, and appends thereto a framing signal in the ninth bit position of output FIFO buffer 204 to mark the byte as the first cell byte.

Next, sequencer 416 causes segment type generator 417 to generate the contents of segment type field 254 and to write them into output FIFO buffer 204, at step 512, by enabling $\leq 58$ comparator 414 and segment type generator 417. Since the first ATM cell 240 formed from the presently-processed send buffer 260 is presently being formed in output FIFO buffer 204, sequencer 416 also sends a BOM signal to segment generator 417.

In response to being enabled, $\leq 58$ comparator 414 compares the byte count of byte counter 408 against 58, and generates an output signal indicative of their relative values. Segment type generator 417 checks the output of $\leq 58$ comparator 414 to determine if there are no more than 58 bytes of unretrieved data left in payload 262 of send buffer 260, and checks the BOM signal input from control sequencer 416 to determine if this is the first ATM cell 240 being formed from contents of this send buffer 260. On the basis of this input, segment type generator 417 generates the correct segment type indication, and writes it through multiplexer 418 into output FIFO buffer 204.

Sequencer 416 then writes contents of "0" register 409 through multiplexer 418 into output FIFO buffer 204, at step 513, to form therein field 255 of ATM cell 240. Next, sequencer 416 causes a byte of data to be DMA'd from payload 262 of buffer 260 and to be stored in output FIFO buffer 204, at step 514. To accomplish this, sequencer 416 sets address multiplexer 405 to accept input from address counter 407.

Upon its initialization (at step 505), address counter 407 is generating an offset pointer to the first byte of payload 262 of send buffer 260. Address multiplexer 405 concatenates the offset pointer generated by address counter 407 with the send buffer 260 pointer supplied by buffer pointer register 406 to create a data byte address, and supplies this address to DMA controller 206. DMA controller 206 retrieves the addressed byte from buffer memory 221 and stores it in data register 404. Sequencer 416 retrieves the byte from register 404 and writes it through multiplexer 418 into output FIFO buffer 204.

Sequencer 416 then checks whether contents of byte counter 408 are zero, at step 516. If not, more unretrieved bytes of data remain in payload 262 of sent buffer 260. Sequencer 416 therefore checks the present count of byte counter 408 against its original (step 504) count to determine if 62 bytes of data have been written from send buffer 260 payload 262 into the ATM cell 240 that is presently being built in output FIFO buffer 204, at step 518. If not, more data can be put into the ATM cell 240, so sequencer 416 increments address counter 407 and decrements byte counter 408, at step 519, and then returns to step 514 to DMA another byte of data from payload 262 of buffer 260 into output FIFO buffer 204. If and when 62 bytes of data have been written into payload 242, ATM cell 240 is full, so sequencer 416 increments address counter 407 and decrements byte counter 408, at step 520, and then returns to step 511 to start building a new ATM cell 240.

Upon entry of the 62nd byte of data into payload 242 of an ATM cell 240, cell controller 419 senses that this is the end of the ATM cell 240, and it generates and stores one or more bytes of cell-delimiting code in output FIFO buffer 204.

Returning to step 516, if contents of byte counter 408 are found to be zero, no unretrieved bytes of data remain in payload 262 of send buffer 260. Sequencer 416 therefore compares the present count of byte counter 408 against its original count to determine if exactly 58 bytes of data have been written into the ATM cell 240 that is presently being built in output FIFO buffer 204, at step 530. If so, just enough room remains in ATM cell 240 to store therein user data length field 257 and buffer payload CRC field 258. Control sequencer 416 therefore causes DMA controller 206 to retrieve user data length field 273 from send buffer 260, and writes it into output FIFO buffer 204, at step 531. The retrieval is accomplished in a manner analogous to the retrieval of header 261 fields 270-272. Control sequencer 416 then causes the data frame's CRC code, stored in CRC register 413, to be written into output FIFO buffer 204, at step 532. Processing of send buffer 260 is thereby completed, and sequencer 416 returns the pointer to that send buffer 260 to controller 220, by writing contents of buffer pointer register 406 into buffer pointer return FIFO 403, at step 533. Sequencer 416 then returns to step 500 to process a new send buffer 260.

Returning to step 530, if exactly 58 bytes of data have not been written into payload 242 of ATM cell 240, sequencer 416 checks whether exactly 62 bytes of data have been written, at step 534. If not, sequencer 416 writes contents of "0" register 409 into output FIFO buffer 204, at step 535, and returns to step 530.

If and when exactly 62 bytes of data have been written into payload 242 of ATM cell 240, the cell is complete. Sequencer 416 then checks the FULL signal line from cell controller 419 to determine if output FIFO buffer 204 is full, at step 536. If so, sequencer 416 keeps repeating the check, waiting for output FIFO buffer 204 to cease being full. If and when output FIFO buffer 204 is not full, sequencer 416 begins to build another ATM cell 240, just for the purpose of conveying user data length field 257 and buffer payload CRC field 258 in output FIFO buffer 204. Steps 537-539, which duplicate steps 511-513, form the header and adaption layer of the new cell. In this instance, the segment type generated at step 538 is invariably EOM. Sequencer 416 then returns to step 530 to pad buffer payload data field 256 of this ATM cell 240 with contents of "0" register 409 before appending the user data length field 51 and buffer payload CRC field 258.

Returning to step 509, if the "raw mode" bit of control register 415 is found there to be set, it indicates that ATM cell 240 construction is not desired. Rather, what is desired is that the contents of payload 262 of send buffer 260 be transmitted "as is". Sequencer 416 therefore merely duplicates the action of block 514 to DMA a byte of buffer 260 data into output FIFO buffer 204, at step 540. Sequencer 416 then increments address counter 407 and decrements byte counter 408, at step 541, and checks the count of counter 407 for whether 68 bytes—the full size of an ATM cell 240—have been written into output FIFO buffer 204, at step 542. If 68 bytes have not been written, sequencer 416 returns to step 540 to write more.

Cell controller 419 does not know the difference between bytes of an ATM cell 240 and bytes of raw data and operates as described above for an ATM cell 240.

If and when 68 bytes of data are found at step 542 to have been written into output FIFO buffer 204, sequencer 416 checks the FULL signal line from cell controller 419 to determine if output FIFO buffer 204 is full, at step 543. If so, sequencer 416 keeps repeating the check waiting for output FIFO buffer 204 to cease being full. If and when output FIFO buffer 204 is not full, sequencer 416 checks whether the count of byte counter 408 is zero, at step 544. If not, more data remains in send buffer 260, and sequencer 416 returns to step 540 to transfer the remaining data from send buffer 260 into output FIFO buffer 204. If the count of byte counter 408 is zero, processing of this send buffer 260 is completed, and sequencer 416 proceeds to step 533.

Figure 10:
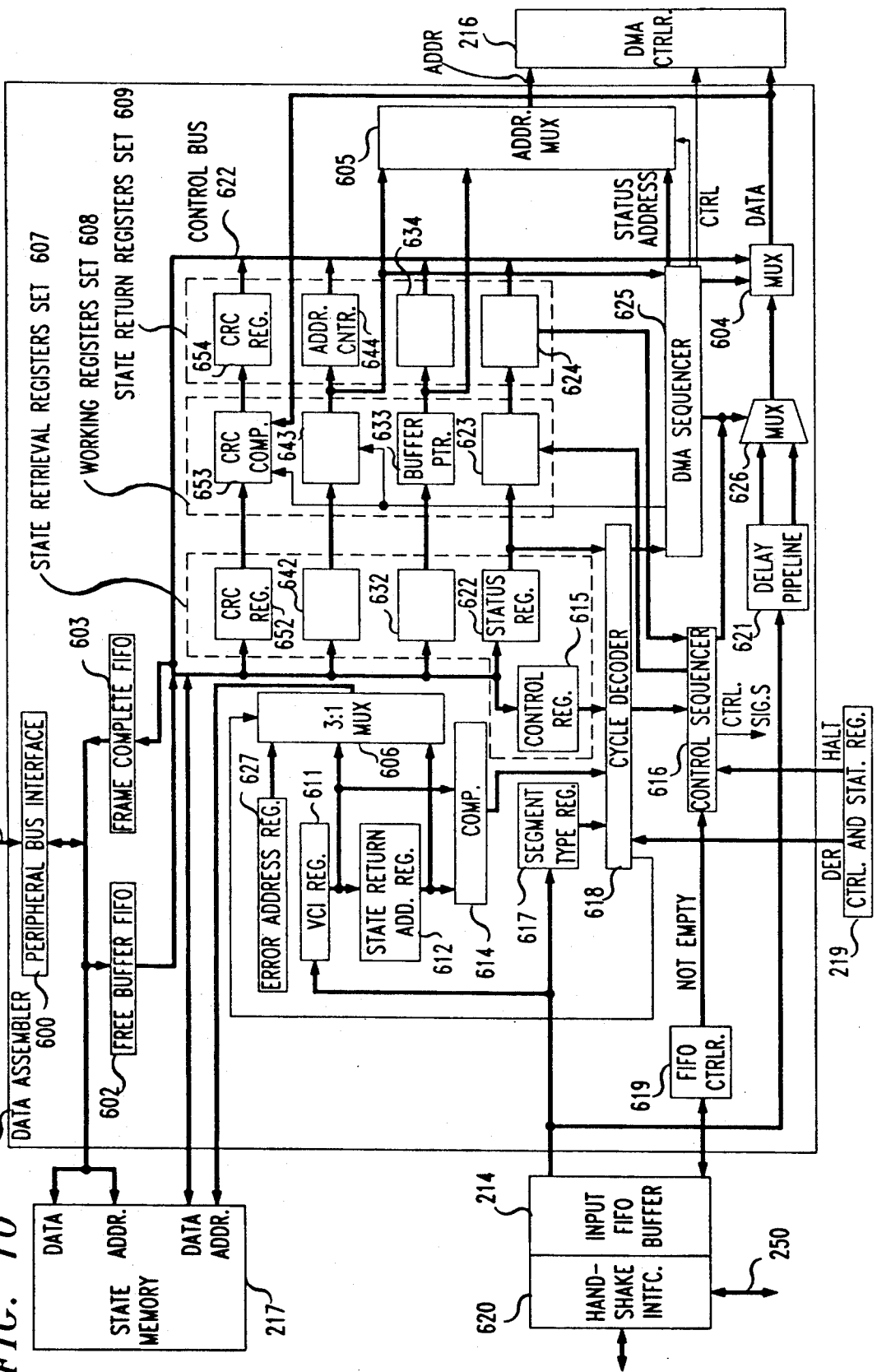
FIG. 10 is a block diagram of the data assembler of the system of FIG. 1.

FIG. 10 shows a block diagram of the structure of data assembler 215. Assembler 215 includes a peripheral bus interface 600 for effecting communications over peripheral bus 231. The output of interface 600 is connected to the input of a free buffer FIFO 602 for storing receive buffer 280 pointers received over bus 231 from controller 220. The output of interface 600 is also connected to an input of state memory 217 for storing virtual channel control information supplied over bus 231 by controller 220. The input of interface 600 is connected to the output of a frame complete FIFO 603, which is used to store receive buffer 280 pointers being returned to controller 220. The output of free buffer FIFO 602, the input of frame complete FIFO 603, and a data input and output of state memory 217 are connected to a control bus 622, which interconnects most elements of data assembler 215.

Control bus 622 interconnects the inputs and outputs of a cascade of state registers sets 607-609. Registers sets 607-609 are thereby connected to each other in a loop fashion, as well as being connected to FIFOs 602 and 603 and memory 217. The cascade of registers sets 607-609 comprises a set 607 of state retrieval registers whos inputs are connected to control bus 622, a set 608 of working registers whose inputs are connected to the outputs of registers set 607, and a set 609 of state return registers whose inputs are connected to the outputs of registers set 608 and whose outputs are connected to control bus 622. Each registers set 607-609 respectively includes a status register 622-624, a buffer pointer register 632-634, and an address counter register 642-644. Registers sets 607 and 609 also each include a CRC register 652 and 654, respectively, while registers set 608 includes a CRC computation circuit 653 in place of a register.

Data assembler 215 operates simultaneously on a plurality of received ATM cells 240 in a pipelined manner, and registers sets 607-609 are used to store information for ATM cells 240 that are presently in the processing pipeline. Set 607 of state retrieval registers stores control information for an ATM cell 240 that is just being entered into the pipeline, i.e., whose processing is commencing. Set 608 of state working registers stores control information and computes a data frame CRC value for an ATM cell 240 that is presently being processed, i.e., one whose processing is presently in "full swing". And set 609 of state working registers stores control information for an ATM cell 240 that is exiting the pipeline, i.e., one whose processing and storage in buffer memory 221 has been completed.

Since link 102 is multiplexed, data assembler 215 must be capable of receiving ATM cells 240 having different VCIs, i.e., pertaining to different data frames, in an interleaved manner. State memory 217 aids this capability: it stores control and state registers information between the time a first and a last ATM cell 240 of a data frame is processed and while data assembler 215 is processing ATM cells 240 of other data frames during that time.

The outputs of buffer pointer register 533 and address counter register 543 of working registers set 608 are also connected to separate inputs of an address multiplexer 605, whose output supplies addresses to DMA controller 216. The output of address counter register 643 is further connected to an input of a DMA sequencer 625, which is a microcoded hardware device that supplies control signals to DMA controller 216. Another input of address multiplexer 605 is connected to a STATUS ADDRESS bus over which DMA sequencer 625 supplies an offset pointer to header 281 fields of a receive buffer 280. Address multiplexer 605 concatenates the buffer pointer supplied by register 533 with offset pointers supplied either by STATUS ADDRESS bus or by address counter register 643 to create for DMA controller 216 the addresses of buffer memory 221 bytes that DMA controller 216 is to write.

Data which are to be written into memory 221 are supplied to DMA controller 216 by the output of a multiplexer 604. Multiplexer 604 output is also connected to a second input of CRC computation circuit 653 to enable circuit 653 to compute CRC codes over data being stored in receive buffers 280. One input of multiplexer 604 is connected to control bus 622 and a second input is connected through a multiplexer 626 to the outputs of a delay pipeline 621. Control commands are supplied to DMA controller 216 over a CTRL bus by DMA sequencer 625. DMA sequencer 625 controls the storage of information by DMA controller 216 in buffer memory 221 by making sure that DMA controller 216 receives the right inputs at the right time. For this purpose, DMA sequencer 625 also controls the selections made by multiplexers 604, 605, and 626.

The input of the above-mentioned delay pipeline 621 is connected to the output of input FIFO buffer 214. Delay pipeline 621 stores bytes of an ATM cell 240 incoming from input FIFO buffer 214 and delays their propagation to DMA controller 216 while processing of the ATM cell 240 header, extraction of state information from state memory 217, determination of actions to be taken, and setting up of the elements of data assembler 215 to take those actions, takes place. In this illustrative embodiment, delay pipeline 621 is selectively 14 or 16 bytes long. That is, delay pipeline 621 has both a 14 byte delay and a 16 byte delay output, both of which are connected to inputs of multiplexer 626. Delay pipeline 621 is illustratively a conventional delay line implemented as a cascade of latches.

The output of input FIFO buffer 214 is also connected to the input of a segment type register 617 and a VCI register 611. Register 617 stores segment type field 254 of an incoming ATM cell 240, while register 611 stores VCI field 251 of that ATM cell 240.

The output of VCI register 611 is connected to an input of a 3:1 multiplexer 606, to the input of a state return address register 612, and to the input of comparator 614. VCI register 611 stores the VCI of an ATM cell 240 incoming into delay pipeline 621, and whose processing control information is to be entered into state retrieval registers set 607. Multiplexer 606 provides contents of VCI register 611 to an address input of state memory 217 for the purpose of loading registers set 607 from state memory 217.

When VCI register 611 is loaded with new contents, its old contents are input to, and stored by, state return address register 612. Register 612 stores the VCI of an ATM cell 240 whose processing has been completed, and whose processing control information is to be stored in state memory 217. The output of register 612 is connected to an input of multiplexer 606 and to a second input of comparator 614. Multiplexer 606 provides contents of register 612 to the address input of state memory 217 for the purpose of loading contents of state return register set 609 into state memory 217.

A third input of multiplexer 606 is connected to an error address register 627. Register 627 contains the address of a predetermined state memory 217 location. Multiplexer 606 connects contents of error address register 627 to the address input of state memory 217 when out-of-ordinary, error treatment is demanded for a received ATM cell 240 by a cycle decoder 618.

Comparator 614 compares the contents of VCI register 611 and state return address register 612. When they are equal, indicating that two consecutive ATM cells 240 incoming from input FIFO buffer 214 have the same VCI and hence belong to the same data frame, comparator 614 generates a signal to prevent present contents of working registers set 608 from being replaced by contents of state retrieval registers set 607. The output of comparator 614 is connected to an input of a cycle decoder 618.

An input of a control register 615 is connected to control bus 622. Register 615 stores per-VCI control information that affects the operation of data assembler 215.

The output of register 615 is connected to a second input of cycle decoder 618. A third input of decoder 618 is connected to the output of segment type register 617, and a fourth input is connected to the output of status register 622 of state retrieval registers set 607. Cycle decoder 618 is a combinatorial-logic circuit that combines the information incoming at its inputs to produce output signals that indicate what type of operational cycles data assembler 215 is to undertake. Decoder 618 is defined by the truth table of FIG. 12. Outputs of decoder 618 are connected to inputs of control sequencer 616 and DMA sequencer 625. A control output of decoder 618 is connected to a control input of multiplexer 606.

Control sequencer 616 is a microcoded hardware device that controls the operation of data assembler 215, and for that purpose has control connections (not shown for clarity) to the various elements 602–615 and 616–654 thereof. Control sequencer 616 is discussed in some detail below in conjunction with FIGS. 13–16. Control sequencer 616 implements the operational cycles dictated by cycle decoder 618. Sequencer 616 also determines the present status of a data frame. To effect storage of the detected status, control sequencer 616 has an output connected to an input of status register 623 of working registers set 608.

A handshake interface 620 couples input FIFO buffer 214 to the communication path that connects it with protocol handler and decoder 213. Interface 620 monitors the contents of input FIFO buffer 214. When it receives indication from protocol handler and decoder 213 that element 213 has an ATM cell 240 to send to input FIFO buffer 214, interface 620 returns permission for the ATM cell 240 to be sent only if and when input FIFO buffer 214 has sufficient empty room to receive the cell. For test purposes, interface 620 also implements loop-around between output FIFO buffer 204 and input FIFO buffer 214, in cooperation with handshake interface 420 of output FIFO 204 and via communication path 250 that interconnects them. When interface 620 receives indication over path 250 from interface 420 that it has an ATM cell 240 to loop-around through input FIFO buffer 214, interface 620 returns permission for the ATM cell 240 to be sent only if and when input FIFO buffer 214 has sufficient empty room to receive the cell and is not in the process of receiving a cell from protocol handler and decoder 213. The input to input FIFO buffer 214 is the same as the output of output FIFO buffer 204: nine bits wide, comprising 8 bits of data and a single framing signal bit that flags the first byte of each ATM cell 240.

Input FIFO buffer 214 also has a FIFO controller 619 connected thereto. FIFO controller 619 keeps track of framing signal bits and read and write pointers of input FIFO buffer 214. Controller 619 determines therefrom if an ATM cell 240 is available in input FIFO buffer 214 for data assembler 215, and generates a signal on the NOT EMPTY lead to control sequencer 616 when an ATM cell 240 is available. Controller 619 considers an ATM cell 240 to be available when input FIFO buffer 214 holds at least four bytes of an ATM cell 240. Also, in response to control input from control sequencer 616, controller 619 causes input FIFO buffer 214 to output a stored ATM cell 240 a byte at a time to delay pipeline 621.

Figures 11, 12:
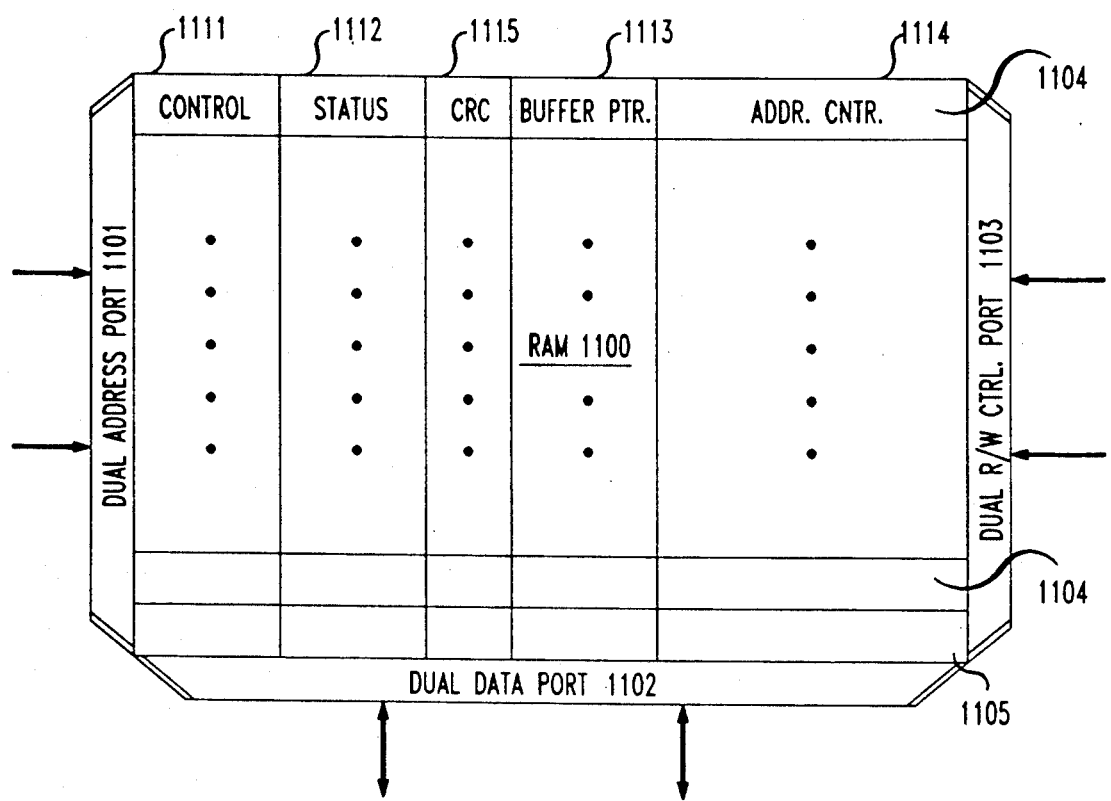
FIG. 11 is a block diagram of the state memory of the system of FIG. 1.
FIG. 12 is a truth table of the cycle decoder of the data assembler of FIG. 10.
Figure 13:
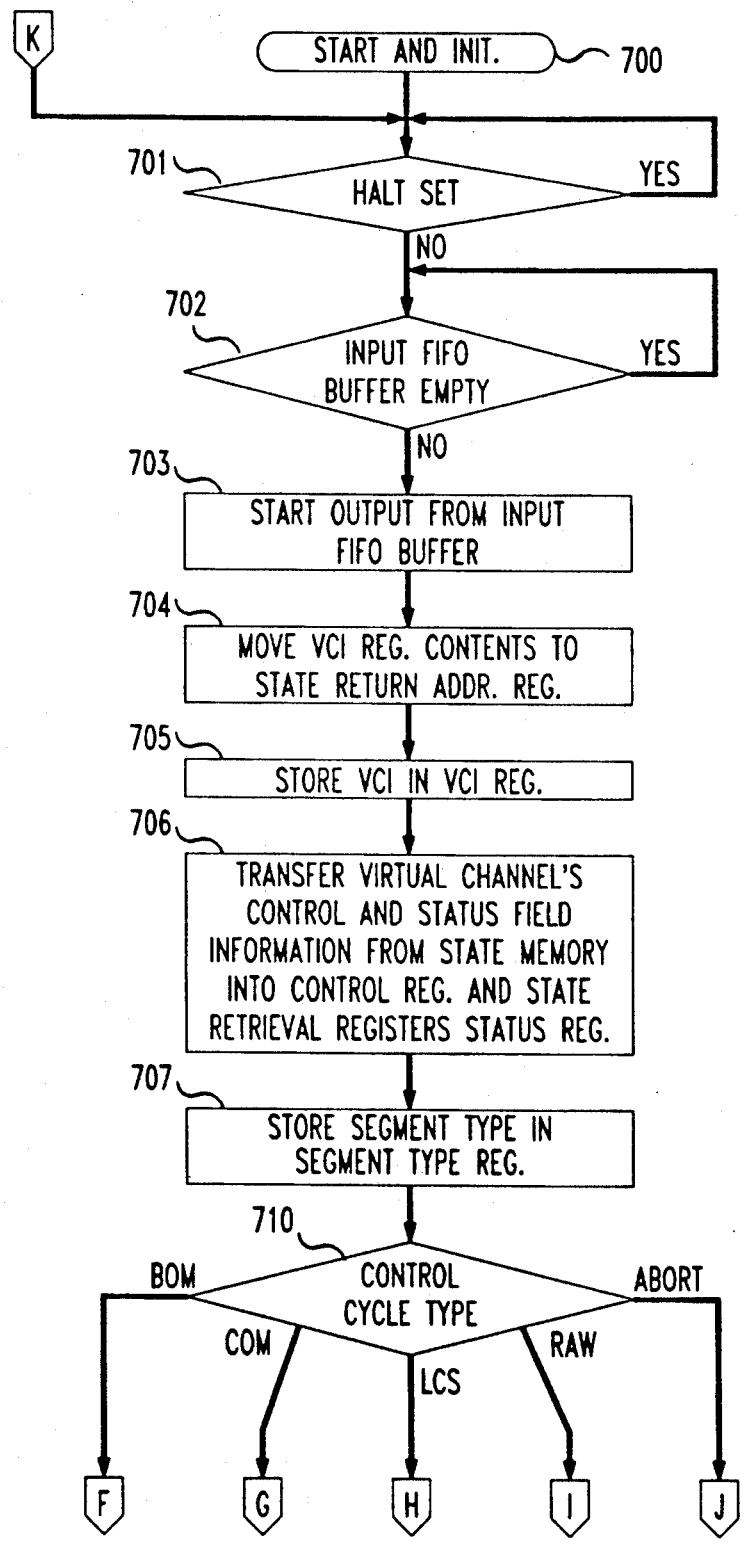
FIGS. 13-16 are a flow diagram of the operations of the control sequencer of the data assembler of FIG. 10.
Figure 14:
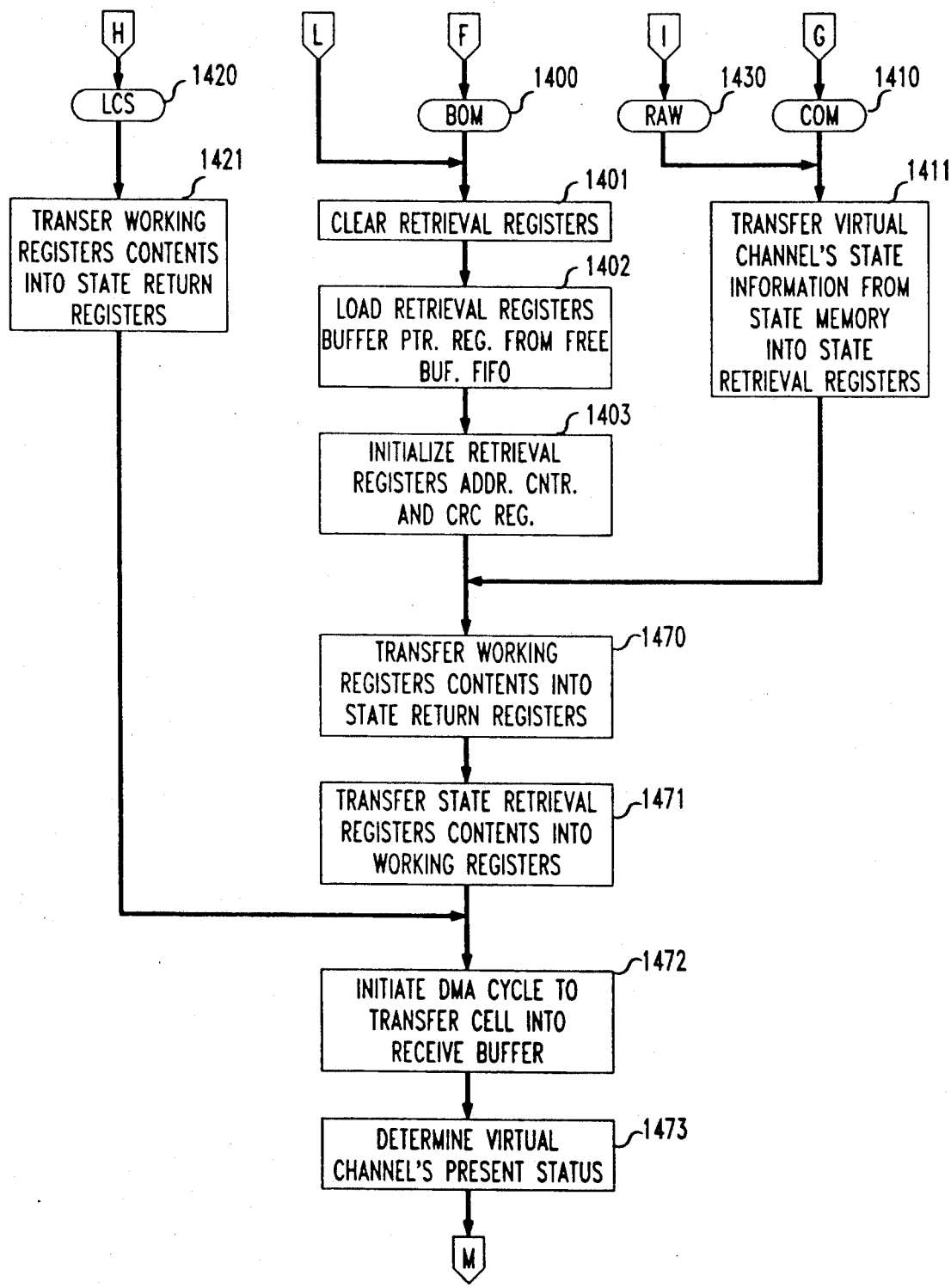
Figure 15:
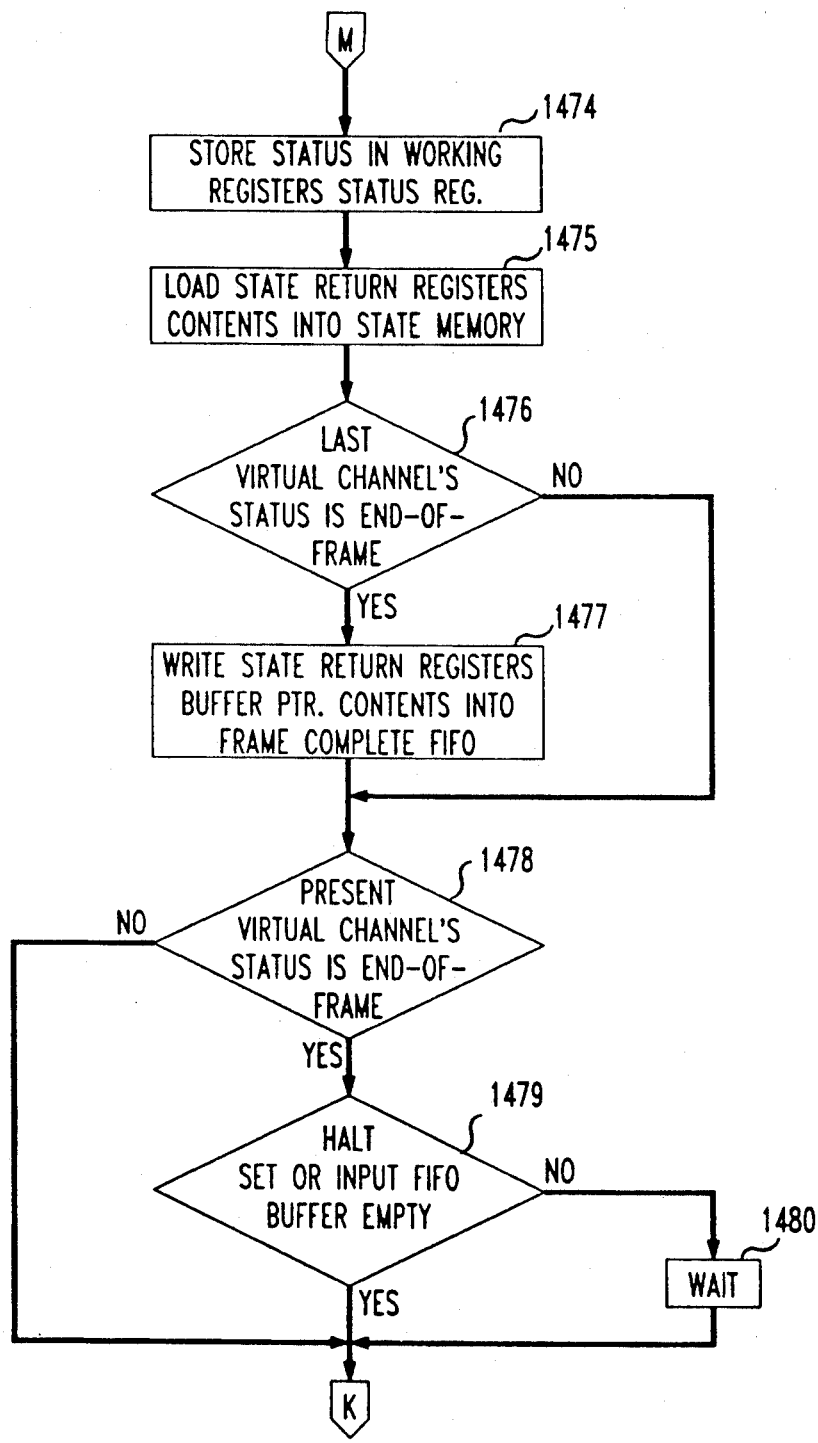
Figure 16:
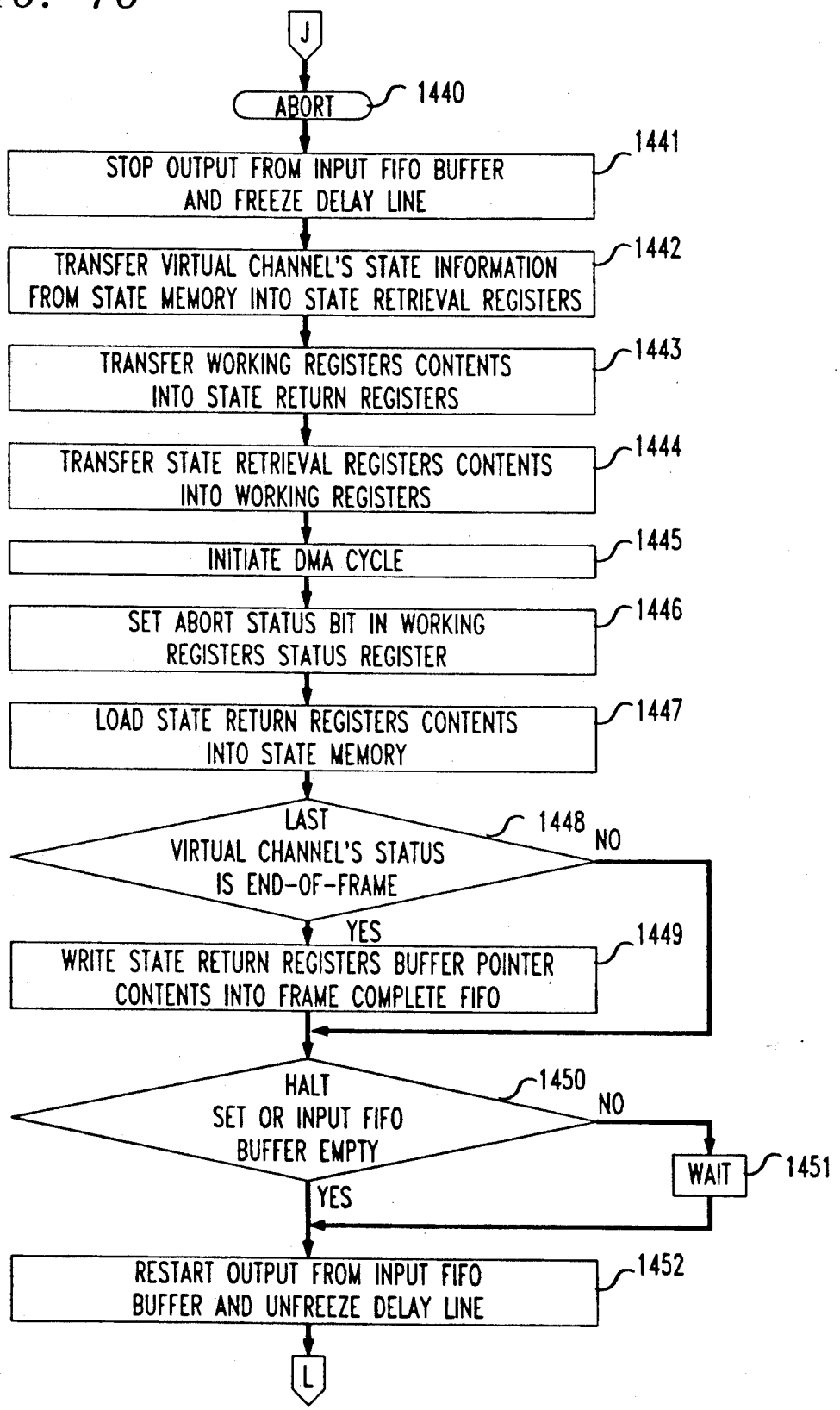

FIG. 11 shows the organization of state memory 217. Memory 217 comprises a dual-ported RAM 1100. Dual ported memories, be they dual-ported physically or logically by way of time-shared access, are well known in the art. A dual address port 1101, is connected to the output of multiplexer 606 over which it receives VCIs, and to the address output of peripheral bus interface 600. A dual data port 1102 is connected to control bus 622 and to the data output of peripheral bus interface 600, and a dual read/write (R/W) control port 1103 is connected to a control lead of control sequencer 616 and to a control output of peripheral bus interface 600.

RAM 1100 stores control and interim state information for data frames being received over virtual channels of link 102 until frame reception is completed. RAM 1100 has an entry 1104 for each valid VCI, and a common entry 1105 for all ATM cells 240 that cycle decoder 615 considers to be affected by error, including all invalid VCIs. RAM 1100 is indexed by the VCI, that is, entries 1104 are addressed by their corresponding VCI. The error entry 1105 is illustratively the last entry of RAM 1101 and is addressed by contents of error address register 627. Entries 1104 and 1105 each contains a plurality of fields 1111-1115: a control field 1111 that corresponds to control field 270 of send buffer 260, a status field 1112 for storing status of the received data frame as determined by control sequencer 616, a buffer pointer field 1113 that identifies the receive buffer 280 used to assemble the data frame, an address counter field 1114 that holds an offset pointer to the next empty byte of payload 282 of the receive buffer 280, and a CRC field 1115 that holds the CRC value calculated over the bytes of the data frame—the payload 282 of the receive buffer 280—that have been received and stored in buffer 280.

State memory 217 requires initialization to properly configure data assembler 215 to receive ATM cells 240. Specifically, buffer pointer field 1113 and address counter field 1114 of entry 1105 must be initialized by controller 220 prior to commencement of receipt of ATM cells 240, and control field 1111 of a VCI's associated entry 1104 must be initialized by controller 220 before an ATM cell 240 is received on its corresponding virtual channel.

Initialization is also required for free buffer FIFO 602. Controller 220 must enter at least one receive buffer 280 pointer in FIFO 602 prior to commencement of processing by data assembler 215, and thereafter must keep FIFO 602 supplied with enough buffer 280 pointers to make sure that data assembler 215 has a receive buffer 280 available whenever it needs one.

FIG. 12 shows a truth table which defines the combinatorial logic functions of cycle decoder 618. Decoder 618 determines the disposition of each ATM cell 240 incoming to data assembler 215 from input FIFO buffer 214 on the basis of six items of information. The first item of information, DER, is whether an ATM cell 240 affected by error is to be dropped. This information is global, i.e., the same for all VCIs. It is represented by the value of a DER bit of control and status register 219, to which decoder 618 has direct access. The second item of information, VALID, is whether an ATM cell's VCI is valid. This information is stored for each VCI in control field 1111 of state memory 217, and decoder 618 determines this information from the value of a VALID bit of control register 615. The third item of information, RAW, is whether an ATM cell's-worth of bytes incoming from input FIFO buffer 214 is to be treated as an ATM cell 240 and processed normally, or is to be treated as raw data and stored in buffer memory 221 without processing. This information is stored for each VCI in control field 1111 of state memory 217, and decoder 618 obtains it from the value of a RAW bit of control register 615. The fourth item of information, LCS, is whether the last-processed ATM cell's VCI is the same as the presently-processed cell's VCI. The determination is made and provided to cycle decoder 618 by comparator 614. The fifth item of information, BOM, is the segment type of the ATM cell 240, specifically, whether or not it is a BOM/SSM type cell. The information is carried by ATM cell 240 itself, and decoder 618 obtains this information from segment type register 617. The sixth item of information, INP, is whether assembly of a data frame is presently in progress for the ATM cell's corresponding VCI. This information is stored for each VCI in status field 1112 of state memory 217, and decoder 618 obtains it from the value of an INP bit of status register 622.

In the table of FIG. 12, a value of zero is a negation of the checked-for condition, a value of one is an affirmation of the checked-for condition, and a value of X is a "don't care" value.

From the above-mentioned six items of information, cycle decoder 618 forms instructions to control sequencer 616 and DMA sequencer 625 to carry out specific operational cycles. As shown in FIG. 12, there are five control cycles and seven DMA cycles. The control cycles are described below in conjunction with FIGS. 13-16, while the DMA cycles are described below in conjunction with FIG. 17.

FIGS. 13-16 show a flow diagram of the operation of data assembler 215 as effected by control sequencer 616. Upon startup and initialization, at step 700, sequencer 616 accesses control and status register 219 to determine if the data assembler "halt" bit thereof is set, at step 701. If so, sequencer 616 keeps periodically repeating the check at step 701 until the data assembler "halt" bit is reset by controller 220. When the "halt" bit is found to be reset, sequencer 616 checks NOT EMPTY signal line from FIFO controller 619 to determine if input FIFO buffer 214 is empty. If so, sequencer 616 keeps repeating the check at step 702, waiting for input FIFO buffer 214 to cease being empty.

When FIFO control 619 determines that an ATM cell 240 is available in input FIFO buffer 214, it generates a "not empty" signal on NOT EMPTY line to sequencer 616. Upon detecting that signal at step 702, sequencer 616 starts output from input FIFO buffer 214, at step 703, by sending a control signal to FIFO controller 619. Controller 619 responds to the signal by causing input FIFO buffer 214 to output a stored ATM cell 240, a byte at a time. One by one, the output bytes enter delay pipeline 621 and begin to propagate therethrough. Sequencer 616 also causes VCI register 611 to output its present contents and causes state return address register to receive and store those contents, at step 704.

The second byte output by input FIFO buffer 214 is the ATM cell's VCI field 251, and sequencer 616 causes VCI register 611 to receive and store this byte, at step 705.

Comparator 614 compares the VCIs held by registers 611 and 612, and if they are equal generates the LCS signal, which is stored by control register 615 and provided to cycle decoder 618.

Sequencer 616 then uses the new contents of VCI register 611 to transfer control field 1111 and status field 1112 of entry 1104 that corresponds to the virtual channel identified by VCI register 611 from state memory 217 into control register 615 and status register 622 of state retrieval registers set 607, at step 706. Sequencer 616 accomplishes this by causing multiplexer 606 to select the VCI register 611 output for connection to state memory 217 address port 1101, causes VCI register 611 to output its contents, and sends a read signal to control port 1103 of state memory 217. At state memory 217, the VCI from VCI register 611 addresses one of the entries 1104, causing fields 1111-1115 of that entry 1104 to be output by the state memory's data port onto control bus 622. Sequencer 616 then causes control register 615 to receive and store control field 1111, and causes status register 622 to receive and store status field 1112.

When input FIFO buffer 214 outputs segment type field 254 of ATM cell 240, sequencer 616 causes segment type register 617 to receive and store it, at step 707.

Segment type register 617, control register 615, and status register 622, as well as DER bit of control and status register 219, present their contents to cycle decoder 618. Decoder 618 determines therefrom control and DMA cycles that control sequencer 616 and DMA sequencer 625 should perform, according to the truth table of FIG. 12, and sends indications thereof to sequencers 616 and 625.

The BOM cycle is performed when contents of segment type register 617 identify the incoming ATM cell 240 as an SSM or a BOM segment cell and the ATM cell 240 is not indicated by other inputs to cycle decoder 618 to be non-standard in some manner (e.g., flawed).

Since an SSM or a BOM cell is the first ATM cell 240 of a data frame, state information presently stored by state memory 217, other than the control field 1111, does not pertain to this ATM cell 240. Therefore, in response to receipt of the BOM cycle indication, at step 1400, sequencer 616 logically clears state retrieval registers set 607, at step 1401. Sequencer 616 then obtains a new receive buffer 280 pointer from free buffer FIFO 602 and stores it in buffer pointer 632, at step 1402. Sequencer 616 also initializes contents of address counter 642 to point to the first byte of payload 282 of receive buffer 280, and initializes CRC register 652, e.g., with values of one for all variables, at step 1403. Sequencer 616 then waits until the last byte of the previously-processed ATM cell 240 (the one whose VCI is presently stored in state return address register 612) is sure to have emerged from delay pipeline 621, and then transfers the contents of working registers set 608 (which presently contain state information pertaining to that previously-processed ATM cell 240) into state return registers set 609, at step 1470. When the first byte of the presently-processed ATM cell 240 is sure to have emerged from delay pipeline 621, sequencer 616 transfers contents of state retrieval registers set 607 (which presently contain state information pertaining to that presently-processed ATM cell 240) into working registers set 608, at step 1471, and sends a start signal to DMA sequencer 625 to initiate the DMA transfer of payload 242 of the presently-processed ATM cell 240 into buffer memory 221, at step 1472. At the end of the DMA cycle, sequencer 616 determines the present status of the virtual channel to which the presently-processed ATM cell 240 corresponds, at step 1473. Illustratively, sequencer 616 merely determines whether the presently-processed ATM cell 240 is an end-of-frame cell. An end-of-frame cell is one having a segment type of EOM or SSM, or one resulting in an abort cycle. Sequencer 616 then stores the determined status in status register 623 of working registers set 608, at step 1474.

When the DMA transfer of the presently-processed ATM cell 240 into buffer memory 221 begins, sequencer 616 loads contents of state return registers set 609 (which pertain to the previously-processed ATM cell 240) into state memory 217, at step 1475. Sequencer 616 accomplishes this transfer by causing multiplexer 606 to connect contents of state return address register 612 to address port 1101 of memory 217, causing state return registers set 609 to output their contents onto control bus 622 to be conveyed thereby to the data port 1102 of memory 217, and sending a write signal to control port 1103 of memory 217.

Sequencer 616 then checks the status of the virtual channel to which the previously-processed ATM cell 240 corresponds, to determine whether it indicates end of frame, at step 1476. The checked status is still contained in status register 624 of state return registers set 609. If the status is not end-of-frame, data frame assembly for that virtual channel has not been completed, and sequencer 616 merely proceeds to step 1478. But if the status is end-of-frame, assembly of that virtual channel's corresponding data frame has been completed, and so sequencer 616 returns the pointer to that data frame's input buffer 280 to controller 220, by writing contents of buffer pointer 634 via control bus 622 into frame complete FIFO 603, at step 1477. Sequencer 616 then proceeds to step 1478.

At the end of assembling of a data frame, DMA sequencer 625 must ensure that status information accumulated with respect to that data frame by data assembler 215 is entered into the data frame's corresponding receive buffer 280. DMA sequencer 625 requires time to do this before it can begin a transfer of another ATM cell 240 into buffer memory 220, and control sequencer 616 must provide DMA sequencer 625 with the required time. Therefore, following step 1476 or 1477, control sequencer 616 checks the status which it determined at step 1473, to see if the presently-processed ATM cell 240 is an end-of-frame cell, at step 1478. If not, DMA sequencer 625 will require no inter-cell 240 time following storage of this ATM cell 240, and so sequencer 616 merely returns to step 701 to begin a new ATM cell 240 processing cycle. But if the presently-processed ATM cell 240 is an end-of-frame cell, DMA sequencer 625 will require inter-cell 240 time following storage of this ATM cell 240. Sequencer 616 checks the data assembler "halt" bit of control and status register 219 and NOT EMPTY line from FIFO controller 619 to determine if the halt bit is set or if input FIFO buffer 214 is empty, at step 1478. If so, receipt and processing of another ATM cell 240 from input FIFO buffer 214 cannot commence, thus providing sufficient inter-cell 240 time for DMA sequencer 625. So sequencer 616 merely returns to step 701 to begin a new ATM cell 240 processing cycle. But if the halt bit is not set and input FIFO buffer 214 is not empty, receipt and processing of another ATM cell 240 could begin immediately. In order to provide required inter-cell 240 time for DMA sequencer 625, sequencer 616 waits, at step 1480, for four byte times in this illustrative example, before returning to step 701 and starting a new ATM cell 240 processing cycle.

The COM cycle is performed when contents of segment type register 617 identify an ATM cell 240 as a COM or an EOM segment cell and the cell 240 is not indicated by other inputs to cycle decoder 618 to be non-standard in some manner.

Since a COM or an EOM cell is not the first ATM cell 240 of a data frame, state information stored in state memory 217 is the proper control information for this ATM cell 240. Therefore, in response to receipt of the COM cycle indication, at step 1410, sequencer 616 completes retrieval of that state information from state memory 217 and causes buffer pointer register 632 to receive and store buffer pointer field 1113, causes address counter register 642 to receive and store address counter field 1114, and causes CRC register 652 to receive and store CRC field 1115, at step 1411. Sequencer 616 then proceeds directly to step 1470. From that point on, the COM cycle duplicates the steps of the BOM cycle, described above.

The LCS cycle is performed when a COM cycle would otherwise be called for, but the previously-processed and the presently-processed ATM cells 240 both belong to the same data frame. In this case, the current state information for the presently-processed ATM cell 240 is to be found in working registers set 608 and not in state retrieval registers set 607. Therefore, in response to receipt of the LCS cycle indication, at step 1420, sequencer 616 performs the equivalent of step 1470 of the COM and BOM cycles, at step 1421, but then dispenses with step 1471 in order to retain the present working registers set 608 contents, and proceeds to step 1472. From that point on, the LCS cycle duplicates the steps of the COM and BOM cycles, described above.

The RAW cycle is performed when cycle decoder 618 finds that a "raw mode" bit of control register 615 is set. The "raw mode" does not call for ATM cell 240 processing. Rather, it calls for bytes incoming from input FIFO buffer 214 to be stored in a receive buffer 280 as received, without change. While this affects the operation of DMA sequencer 625, from the standpoint of sequencer 616 the raw cycle duplicates the COM cycle. Therefore, in response to receipt of the RAW cycle indication at step 1430, sequencer 616 proceeds to step 1411 to duplicate the COM cycle, described above. Since the raw data being stored in receive buffer 280 may not be an ATM cell 240 in this case, step 1472 involves initiating a DMA transfer of a cell's worth of bytes—68 in this example—into receive buffer 280.

The ABORT cycle is performed when the presently-received ATM cell 240 is found to be in error because segment type register 617 identifies the received ATM cell 240 as a BOM or an SSM segment cell whereas status register 622 indicates that data assembler 215 is in the midst of assembling a data frame for this VCI. This indicates that there is an EOM segment type cell missing. The ABORT cycle stops assembly of this data frame and begins assembly of a new data frame for this VCI. Consequently, the ABORT cycle effectively consists of a COM cycle followed by a BOM cycle. In order to perform this pair of cycles, sequencer 616 requires additional time. Therefore, in response to receipt of the ABORT cycle indication, at step 1440, sequencer 616 waits until the last byte of the proceeding ATM cell 240 has exited delay pipeline 621, and then both (a) stops output from input FIFO buffer 214 by stopping FIFO controller 619 and (b) freezes, i.e., halts, propagation of bytes through delay line 621, at step 1441. Stopping propagation of ATM cell 240 bytes through, data assembler 215 gives sequencer 616 time to perform a modified COM cycle. Sequencer 616 then executes steps 1442 through 1451 which replicate the COM cycle (steps 1441 and 1470–1480), with the following changes. Step 1472 is replaced by step 1445 because no bytes on which a DMA operation could be performed are exiting delay line 621. Steps 1473 and 1474 are collapsed into step 1446. Step 1478 is not replicated because the COM component of the abort cycle by definition marks the end of assembly of a frame.

The modified COM cycle thus being completed, sequencer 616 is ready to commence assembly of a new data frame. It therefore causes FIFO controller 619 to restore output from input FIFO buffer 214 and unfreezes, i.e., resumes propagation of bytes through, delay line 621, at step 1452. bytes through delay line 621, at step 1452. Sequencer 616 then proceeds to step 1401 to perform the BOM component of the ABORT cycle.

Figure 17:
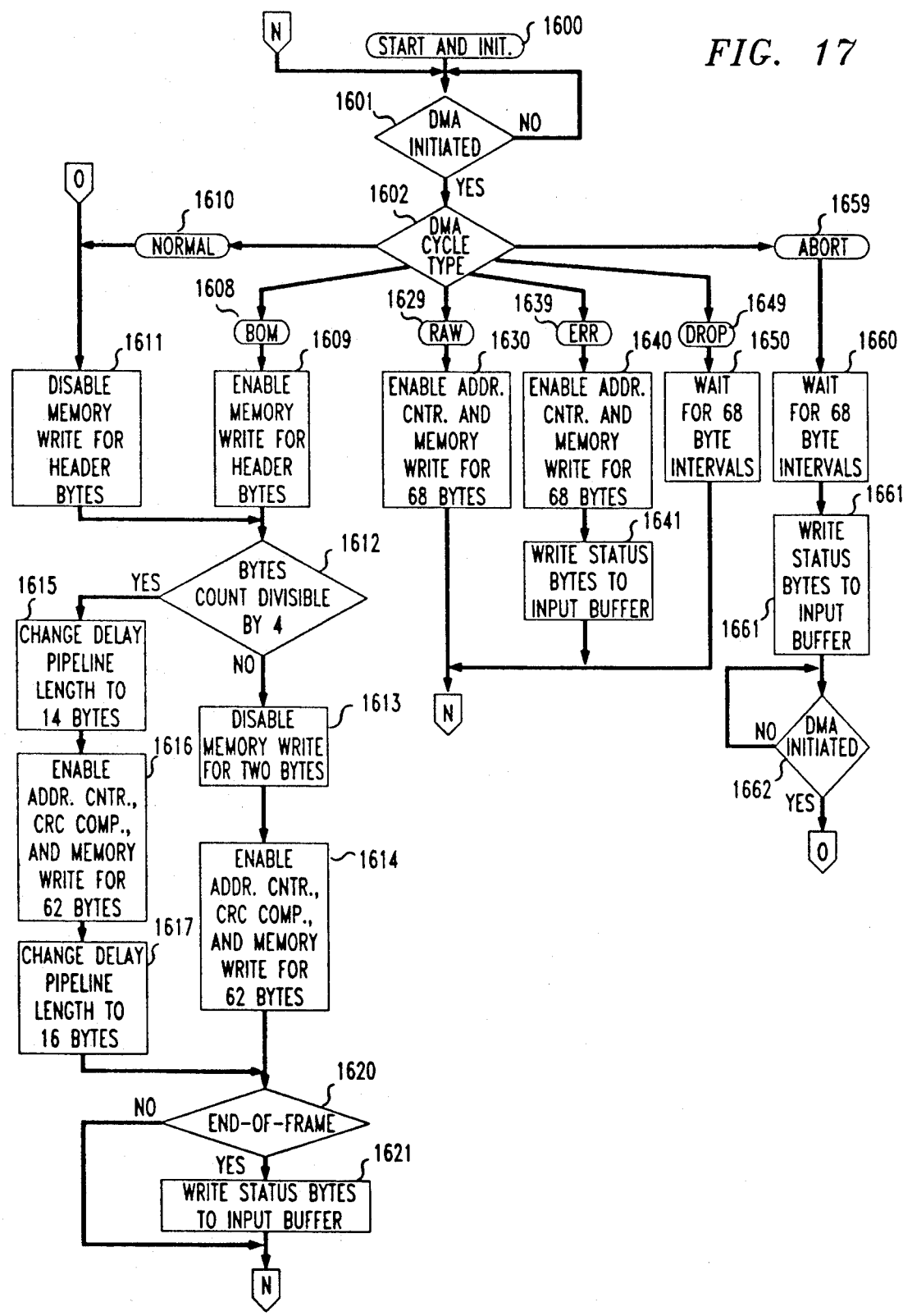
FIG. 17 is a flow diagram of the operations of the DMA sequencer of the data assembler of FIG. 10.

FIG. 17 shows a flow diagram of the functions performed by DMA sequencer 625. Upon startup and initialization, at step 1600, sequencer 625 starts monitoring input from control sequencer 616, waiting for initiation of DMA operation, at step 1601. When control sequence 616 initiates DMA operation (see steps 1472 and 1445 of FIGS. 14 and 16), sequencer 625 checks the input from cycle decoder 618 to determine the DMA cycle type that is being commanded, at step 1602.

If a BOM cycle is received, at step 1608, it means that writing of a new receive buffer 280 is about to commence, and hence its header 281 fields must be filled in. Sequencer 625 therefore enables writing of buffer memory 221 for header bytes of an ATM cell 240 exiting delay pipeline 621, at step 1609. Sequencer 625 accomplishes this by causing address multiplexer 605 to switch connection of its output to the STATUS ADDRESS bus, enabling DMA controller 216, and generating on STATUS ADDRESS bus the offset pointer to the first byte of a receive buffer 280 while the first four bytes of an ATM cell 240 are being supplied by multiplexer 604 to DMA controller 216. Multiplexer 605 concatenates the offset pointer with contents of buffer pointer register 633 of working registers set 608 to form the buffer memory 221 address at which DMA controller 216 is to store the header information. DMA controller 216 collects the four header bytes and writes them as a single word into buffer memory 221.

If a NORMAL cycle is received, at step 1610, it indicates continuation of writing of a receive buffer 280 whose writing was commenced in a previous cycle, and hence its header 281 fields are already written and need not be filled in. Sequencer 625 therefore disables writing of buffer memory 221 while header bytes of an ATM cell 240 are exiting delay pipeline 621, at step 1611.

Henceforth, both BOM and NORMAL cycles are identical. The next two ATM cell 240 bytes exiting delay pipeline 621 are segment type field 254 and MID field 255, which are not stored by receive buffer 280 and are dropped. But without fields 254 and 255, payload 242 of an ATM cell 240 is only 62 bytes long. DMA controller 216 preferably collects four bytes of data from data assembler 215 and then writes them all at once into a single word of buffer memory 221. Though DMA controller 216 writes four bytes at once, it has the ability to selectively prevent any of the four bytes from being written.

The 62 byte payload is not evenly divisible by four, and therefore multi-cell frames require memory writes to begin on both word boundaries and half-word boundaries. Sequencer 625 therefore checks whether the contents of working registers set 608 address counter 643 are evenly divisible by four, at step 1612. If so, it means that writing of buffer memory 221 is commencing at a word boundary. The first byte of the data portion of payload 242 of an ATM cell 240 is written into the first byte of a memory word. The sequence takes advantage of the fact that the ATM cell 240 bytes corresponding to fields 254 and 255 are dropped. Sequencer 625 switches the input of multiplexer 626, thereby effectively changing the length of delay pipeline 621 from 16 to 14 bytes, at step 1615. ATM cell fields 254 and 255 are at this time in the last two bytes of delay pipeline 621. Switching the length of delay pipeline 621 effectively drops the bytes containing fields 254 and 255 and advances the remaining bytes of the payload up two byte positions so they are properly aligned to be written, starting at the first byte of a memory word. Sequencer 625 then enables address counter register 643 to increment during each byte time, enables CRC computation circuit 653 to commence CRC computations, and enables DMA controller 216 to write bytes received from delay pipeline 621 into buffer memory 221, at step 1616. Address multiplexer 605 concatenates the contents of address counter 643 with the contents of buffer pointer 633 to generate the buffer memory 221 addresses at which DMA controller 216 writes the received data. Sequencer 625 maintains the enablement at step 1616 for 62 byte times.

After the 62 bytes of ATM cell 240 payload 242 have been written into buffer memory 221, sequencer 625 switches again the input of multiplexer 626, thereby effectively changing the length of delay pipeline 621 back from 14 to 16 bytes, at step 1617. This results in the last two bytes of payload 242 reaching DMA controller 216 for the second time. But because DMA controller 216 is now no longer enabled, these duplicate bytes are not written into buffer memory 221.

Returning to step 1612, if address counter 643 is not divisible by four, the writing of buffer memory 221 is commencing at a half-word boundary, because the word had previously been written with the last two bytes of a previous ATM cell 240 payload 242. In this instance, sequencer 625 merely disables the writing of buffer memory 221 for two bytes, at step 1613, to drop fields 254 and and 255 and prevent writing over data in the first two bytes of the memory word. The first two bytes of the data portion of payload 242 is written into the third and fourth bytes of a memory word. Sequencer 625 then performs an enablement step 1614 which duplicates step 1616.

Following step 1614 or 1617, sequencer 625 checks again the input from cycle decoder 618 to determine if the ATM cell 240 that was just written into buffer memory 221 represented an end of a data frame, at step 1620. If not, sequencer 625 merely returns to step 1601 to await initiation of a new DMA cycle. But if the ATM cell 240 did represent an end of a data frame, sequencer 625 causes status information for that data frame to be written into buffer memory 221, at step 1621. Sequencer 625 does so by causing multiplexer 604 to switch connection of its output from delay line 621 to control bus 622, causing address multiplexer 605 to switch connection of its output to the STATUS ADDRESS bus, generating the displacement pointer to the second word of receive buffer 280, and enabling DMA controller 216. Multiplexer 604 supplies to DMA controller 216 the contents of status register 624, address counter register 644, and CRC register 654, of state return registers set 609. DMA controller 216 stores contents of register 644 in last-received-byte-displacement field 292, and stores contents of register 624 along with the one-bit CRC-code remainder contents of register 654 in status field 293, at the address produced by address multiplexer 605. The storage of the data frame status information into receive buffer 280 being accomplished, sequencer 625 returns from step 1621 to step 1601 to await the start of a new DMA cycle.

Returning to step 1602, if a RAW cycle is received, at step 1629, sequencer 625 merely enables address counter register 643 to increment during each byte time and enables DMA controller 216 to write bytes received from delay pipeline 621 into buffer memory 221, at step 1630, for 68 byte times to cause a full ATM cell's 240-worth of bytes to be written in buffer memory 221. Sequencer 625 then returns to step 1601.

The ERR or DROP cycle is performed when the presently-received ATM cell 240 is found by cycle decoder 618 to be in error, either because the contents of control register 615 indicate that the VCI of the received ATM cell 240 is invalid, or because segment type register 617 identifies the received ATM cell 240 as an EOM or COM segment cell whereas status register 622 does not indicate that it has been preceded by a BOM cell. Whether the ERR or DROP cycle is performed is determined by the value of a DER bit of control and status register 219.

If the ERR cycle is received, at step 1639, the errored ATM cell 240 is to be saved. Sequencer 625 therefore performs step 1640, which duplicates step 1630 of the RAW cycle, to save the full ATM cell 240. Sequencer 625 then performs step 1641, to append the status information to the end of the ATM cell 240. Sequencer 625 then returns to step 1601.

If the DROP cycle is received, at step 1649, the errored ATM cell 240 is to be discarded. Sequencer 625 therefore merely waits 68 byte times without doing anything, at step 1650, and then returns to step 1601.

If an ABORT cycle is received, at step 1659, no data is being provided by the frozen delay pipeline 621 during the first half of the cycle. Sequencer 625 therefore merely waits 68 byte times without doing anything, at step 1660. Sequencer 625 then performs step 1661, which duplicates step 1621 of the NORMAL and BOM cycles, to store the status information along with the aborted data frame. Thereafter, sequencer 625 awaits initiation by control sequencer 616 of the second half—the COM phase—of the ABORT cycle, at step 1662. Upon its initiation, sequencer 625 proceeds to step 1611 to perform the NORMAL cycle.

Of course, it should be understood that various changes and modifications may be made to the above-described illustrative embodiment of the invention. For example, the data assembler architecture may be applied to the data segmenter to allow it to multiplex (interleave) ATM cells of different frames. Different sizes of ATM cells could be accommodated. Instead of CRC code calculated over the frame, individual cells could have a CRC check performed over the payload of the cell, combined with successive cells of a frame having sequence numbers. The sequence numbers would be stored in the state memory each time. When a new ATM cell arrived, the new sequence number would be checked against the old number to ensure that they differ by one. Status and control fields within a buffer could be positioned differently. Buffer pointers and displacements could be added instead of being concatenated. Buffer pointers could be of any desired length. The state memory could hold different control bits to vary how the cell is received. The delay pipeline could be of a different size to produce any particular desired delay. The state memory, rather than being addressed directly by the VCI value, could use the VCI value to be an input to an address translation function which in turn would address the state memory. E.g., a content addressable memory could be used to allow 20-bit VCI values or MIDs to be recognized and be translated into the numbers of concurrent channels to be supported. Or, buffer pointer FIFOs could be partially implemented in the buffer memory with linked lists, and the DMA controllers provided access thereto. Such changes and modifications may be made without departing from the spirit and the scope of the invention. It is therefore intended that such changes and modifications be covered by the following claims.

I claim:

1. An interfacing arrangement comprising:
   an input port for receiving data in a serial form;
   an output port for transmitting processed received data;
   data delay means interconnecting the input port and the output port for delaying propagation of received data from the input port to the output port to provide time for the processing of the data;
   a state memory for storing information concerning data receivable at the input port;
   a cascade of connected storage means connected to the state memory and including
   first storage means for storing information concerning data whose processing is commencing,
   second storage means for storing information concerning data presently being processed, and
   third storage means for storing information concerning data whose processing is ending; and
   control means connected to the cascade of storage means and to the delay means, (a) responsive to commencement of entry of data into the delay means for transferring information concerning the entering data from the state memory into the first storage means and determining from contents of the first storage means what type of processing to perform on the entering data, (b) responsive to commencement of emergence of the data from the delay means for transferring information concerning the emerging data from the first storage means into the second storage means and using contents of the second storage means to perform the determined type of processing on the emerging data, and (c) responsive to completion of emergence of the data from the delay means for transferring information concerning the emerged data from the second storage means into the third storage means and transferring contents of the third storage means into the state memory for use by future entering data.

2. The arrangement of claim 1 further comprising
   buffer means for receiving a pointer to a storage area in a memory; wherein
   the control means are further responsive to commencement of entry of data into the delay means for transferring the pointer from the pointer receiving means into the first storage means; and wherein
   the output port comprises
   means for storing data exiting the delay means in the memory in the storage area pointed to by the pointer contained in the second means.

3. The arrangement of claim 2 further comprising
   second buffer means for receiving the pointer when the pointed-to storage area contains data; and wherein
   the control means are further responsive to completion of emergence of the data from the delay means for transferring the pointer from the third storage means into the second buffer means.

4. An interfacing arrangement comprising:
   an input port for receiving blocks of data each in a serial form;
   an output port for transmitting processed received blocks of data;
   a delay pipeline interconnecting the input port and the output port for delaying propagation of received blocks of data from the input port to the output port to provide time for processing of the blocks of data;
   a cascade of registers sets including
   first registers set for storing information concerning each block of data entering the delay pipeline (first blocks),
   second registers set connected to the first registers set for storing information concerning each block of data exiting the delay pipeline (second blocks), and
   third registers set connected to the second registers set for storing information concerning each block of data completing exiting of the delay pipeline (third blocks);
   a state memory connected to the cascade of registers sets for storing information concerning blocks of data receivable at the input port; and
   control means connected to the cascade of registers sets, the output port, and the state memory, and (a) responsive to each one of a plurality of first blocks for transferring information concerning the first block from the state memory into the first registers set and determining from contents of the first registers set what type of processing to perform on the first block, (b) responsive to each one of a plurality of second blocks for transferring information concerning the second block from the first registers set into the second registers set and using contents of the second registers set to perform the determined type of processing on the second block, and (c) responsive to each one of a plurality of third blocks for transferring information concerning the third block from the second registers set into the third registers set, and transferring contents of the third registers set into the state memory for use with another first block.

5. The arrangement of claim 4 wherein
one or more blocks of data comprise a frame of data;
the arrangement further comprises a first pointer buffer for storing pointers to memory areas storing data frames in buffer memory;
the output port comprises means for storing processed blocks of data in the buffer memory in the memory area pointed to by a pointer contained in the second registers set; and
the control means are responsive to a third block of data being an end of a data frame, for transferring a pointer to a memory area storing the data frame from the third registers set into the first pointer buffer.

6. The arrangement of claim 5 further comprising
a second pointer buffer for storing pointers to memory areas for storing data frames in the buffer memory; and wherein
the control means are further responsive to a first block of data being a beginning of a data frame for retrieving from the second pointer buffer a pointer and storing the retrieved pointer in the first registers set.

7. The arrangement of claim 4 wherein
one or more blocks of data comprise a frame of data; and
the control means are responsive to a first block of data being a beginning of a data frame for initializing contents of the first registers set, and are further responsive to a second block of data being an end of a data frame for causing the output port to transmit contents of the second registers set.

8. The arrangement of claim 4 wherein
the control means are further responsive to successive second and third blocks of data being of the same frame for blocking transfer of information concerning the second block from the first registers set into the second registers set and using existing contents of the second registers set to perform the determined type of processing on the second block.

9. The arrangement of claim 4 wherein
each block of data includes a header of information, and one or more blocks of data comprise a frame of data;
the arrangement further comprises
a first pointer buffer for storing pointers to memory areas for storing data frames in a buffer memory, and
a second pointer buffer for storing pointers to memory areas storing data frames in the buffer memory;
the output port comprises
means for storing processed blocks of data in the buffer memory in the memory area pointed to by a pointer contained in the second registers set; and
the control means further are responsive to a first block of data being a beginning of a data frame for initializing contents of the first registers set and retrieving from the first pointer buffer a pointer and storing the retrieved pointer in the first registers set, are responsive to a second block of data being a continuation of a data frame for using contents of the second registers set obtained from the state memory through the first registers set to perform the determined type of processing on the second block, are responsive to a third block and a successive second block of data being of the same frame for blocking transfer of information concerning the second block from the first registers set into the second registers set and using existing contents of the second registers set to perform the determined type of processing on the second block, are responsive to a second block of data being a beginning of a data frame for causing the output port to store the block including information from the header, are responsive to a second block of data being a continuation of a data frame for causing the output port to store the block excluding the header, are responsive to a second block of data being an end of a data frame for causing the output port to store contents of the second registers set in the buffer memory in the memory area pointed to by a pointer contained in the second registers set, and are responsive to a third block of data being an end of a data frame for retrieving a pointer to a memory area storing the data frame from the third registers set and storing the retrieved pointer in the second pointer buffer.

10. The arrangement of claim 9 wherein
the control means are responsive to predetermined control information being included among the information transferred from the state memory into the first registers set for causing the output port to store the entire corresponding block including the header.

11. An arrangement for assembling asynchronous transfer mode (ATM) cells, comprising frames of data and each having a header including a virtual channel identifier (VCI) and having a segment type identifier (STI), into the frames of data, the arrangement comprising:
an input port for receiving ATM cells each in a serial form;
a DMA circuit for storing received data in a memory;
a delay pipeline connected between the input port and the DMA circuit for delaying propagation of ATM cells from the input port to the DMA circuit to provide time for processing of the ATM cells;
a cascade of registers sets including
a first registers set, including a control register, a status register, and a buffer pointer register, for storing information concerning each ATM cell entering the delay pipeline,
a second registers set, connected to the first registers set and including a status register and a buffer pointer register, for storing information concerning each ATM cell presently exiting the delay pipeline, and
a third registers set, connected to the second registers set and including a status register and a buffer pointer register, for storing information concerning each ATM cell completing exiting of the delay pipeline;
a state memory connected to the cascade of registers sets and for each valid virtual circuit storing information including control information concerning ATM cells corresponding to that virtual circuit;
a first pointer buffer for storing pointers to memory buffers for storing data frames in the memory;
a second pointer buffer for storing pointers to memory buffers storing data frames in the memory;

comparator means for determining whether an exiting ATM cell and a consecutive entering ATM cell have a same VCI; and a control arrangement connected to the comparator means, the pointer buffers, the state memory, the registers sets, and the DMA circuit, and including means responsive to each entering ATM cell for using the VCI of the entering ATM cell to transfer from the state memory into the first registers set the information including the control information concerning the entering ATM cell, means for using the transferred control information and the STI of the entering ATM cell to determine what type of processing to perform on the corresponding ATM cell, means responsive to a determination of beginning-of-frame type of processing for initializing contents of the status register of the first registers set and transferring a pointer from the first pointer buffer into the buffer pointer register of the first registers set, means responsive to a determination of continuation or end-of-frame type of processing for one of (a) maintaining present contents of the first registers set transferred from the state memory and (b) using the VCI of the entering ATM cell to transfer from the state memory into the first registers set the information including state and buffer pointer information concerning the entering ATM cell, means responsive to each entering ATM cell becoming a presently-exiting ATM cell accompanied by a determination that consecutive exiting and entering ATM cells have different VCIs for transferring information concerning the presently-exiting ATM cell from the first registers set into the second registers set, and responsive to each entering ATM cell becoming a presently-exiting ATM cell accompanied by a determination that consecutive exiting and entering ATM cells have the same VCI for maintaining present contents of the second registers set, means responsive to contents of the status register of the second registers set and the determined type of processing for generating status information for the presently-exiting cell and storing the generated status information in the status register of the second registers set, means responsive to a determination of beginning-of-frame type processing for causing the DMA circuit to store the presently-exiting ATM cell including header information in the memory in a memory buffer pointed to by contents of the buffer pointer register of the second registers set, means responsive to a determination of continuation-of-frame type of processing for causing the DMA circuit to store the presently-exiting ATM cell excluding header information in the memory in a memory buffer pointed to by contents of the buffer pointer register of the second registers set, means responsive to a determination of end-of-frame type processing for causing the DMA circuit to store the presently-exiting ATM cell excluding header information and further to store contents of the second registers set, both in the memory in a memory buffer pointed to by contents of the buffer pointer register of the second registers set, means responsive to each presently-exiting ATM cell completing exiting of the delay pipeline for transferring information concerning the completing-exiting ATM cell from the second registers set into the third registers set, means for transferring contents of the third registers set into the state memory for use with another ATM cell having a same VCI as the completing-exiting ATM cell, and means responsive to a determination of end-of-frame type of processing for transferring contents of the buffer pointer register of the third registers set into the second pointer buffer.

12. The arrangement of claim 11 wherein the input port is for receiving ATM cells including blocks of data having a VCI and a same data length as an ATM cell; and the control arrangement further comprises means responsive to a determination of special type of processing for causing the DMA circuit to store the whole presently-exiting ATM cell unchanged in the memory in a memory buffer pointed to by contents of the buffer pointer register of the second registers set.

13. An interfacing arrangement comprising:

means for retrieving data from storage;

means for receiving a pointer to both a stored frame of data and stored control information for the frame;

means connected to the retrieving means and the receiving means for causing the retrieving means to use the received pointer to retrieve the control information from the storage;

means connected to the retrieving means for storing the retrieved control information;

an output port connected to the retrieving means; and control means connected to the retrieving means and to the storing means for (a) generating from the retrieved control information a data-block header at the output port and (b) thereafter for causing the retrieving means to use the received pointer to retrieve from storage and transmit to the output port a block of data of the pointed-to frame, and repeating both (a) and (b) until all data of the pointed-to frame have been retrieved.

14. The arrangement of claim 13 wherein the control means include means responsive to all data of the pointed-to frame having been retrieved for generating at the output port trailer information for the pointed-to-frame.

15. The arrangement of claim 13 wherein each block of data which the control means cause the retrieving means to retrieve is a fixed-size block of data.

16. The arrangement of claim 15 wherein the control means include means responsive to data of the pointed-to frame that remain unretrieved being less than a block of the fixed size for causing the retrieving means to lastly retrieve from storage and transmit to the output port the remaining unretrieved data and thereafter generating at the output port padding data to form together with the lastly retrieved data a block of data of the fixed size at the output port.

17. The arrangement of claim 15 wherein the control means include means responsive to data of the pointed-to frame that remain unretrieved being no more than a block of the fixed size minus a predetermined amount for causing the retrieving means to lastly retrieve from storage and transmit to the output port the remaining unretrieved data and thereafter generating at the output port the predetermined amount of trailer data for the pointed-to frame plus any padding data needed to form together with the lastly-retrieved data and the trailer data a block of data of the fixed size at the output port, and responsive to data of the pointed-to frame that remain unretrieved being both more than a block of the fixed size minus a predetermined amount and no more than a block of the fixed size for causing the retrieving means to lastly retrieve from storage and transmit to the output port the remaining unretrieved data and thereafter generating at the output port any padding data needed to form together with the lastly-retrieved data a block of data of the fixed size at the output port, thereafter generating from the retrieved control data a data block header at the output port and thereafter generating at the output port the predetermined amount of the trailer data plus any padding data needed to form together with the trailer data a block of data of the fixed size at the output port.

18. The arrangement of claim 15 wherein
the control means include
means responsive to an amount of data of the pointed-to frame remaining unretrieved for generating information at the output port following each data block header and identifying the data block as one of a beginning of frame, a continuation of frame, an end of frame, and a single-block frame.

19. The arrangement of claim 13 wherein
the control means include
means for (a) generating from the retrieved control data a header of an asynchronous transfer mode (ATM) cell and (b) thereafter for causing the retrieving means to retrieve from storage and transmit to the output port a fixed-size block of data of the pointed-to frame to form an ATM cell, and repeating both (a) and (b) until all data of the pointed-to frame have been retrieved.

20. The arrangement of claim 13 wherein
the control means are responsive to retrieval of predetermined control information for dispensing with header generation and merely causing the retrieving means to use the received pointer to retrieve the pointed-to frame from the storage and transmit it to the output port.

21. An interfacing arrangement comprising:
a direct memory access (DMA) circuit for retrieving data from a memory in a serial manner;
a first first-in first-out (FIFO) buffer for receiving a pointer to a receive buffer in the memory and storing a frame of data and control information for the frame, and also for receiving an identifier of a virtual channel on which the frame is to be transmitted;
a second FIFO buffer for receiving the pointer to the receive buffer when the frame stored by the buffer has been transmitted;
register means connected to the DMA circuit for storing control information retrieved from the memory;
an output port to a link, connected to the DMA circuit;
a controller connected to the DMA circuit, the FIFO buffers, and the register means, for retrieving the buffer pointer from the first FIFO buffer and causing the DMA circuit to use the retrieved buffer pointer to retrieve the control information from the receive buffer pointed to by the retrieved buffer pointer, causing the register means to store the retrieved control information, and then (a) generating from the retrieved control information an asynchronous transfer mode (ATM) cell header at the output port, (b) generating an ATM cell segment type identifier at the output port, and (c) causing the DMA circuit to use the retrieved buffer pointer to retrieve from the receive buffer pointed to by the retrieved buffer pointer and to transmit to the output port in the serial manner a fixed-size block of data of the frame, repeatedly until all data of the frame have been retrieved and transmitted, and then writing the buffer pointer into the second FIFO buffer.

22. The arrangement of claim 21 wherein
the controller is responsive to presence of predetermined information among the control information retrieved from the pointed-to buffer for dispensing with ATM cell header and segment type identifier generation and merely causing the DMA circuit to use the retrieved buffer pointer to retrieve from the receive buffer pointed to by the retrieved buffer pointer and to transmit to the output port in a serial manner the frame of data.

* * * * *